(12) United States Patent
Oki

(10) Patent No.: US 8,833,858 B2
(45) Date of Patent: Sep. 16, 2014

(54) RECLINING MECHANISM

(71) Applicant: Delta Kogyo Co., Ltd., Hiroshima (JP)

(72) Inventor: Yasukazu Oki, Fuchu-cho (JP)

(73) Assignee: Delta Kogyo Co., Ltd., Aki-gun (JP)

( * ) Notice: Subject to any disclaimer, the term of this patent is extended or adjusted under 35 U.S.C. 154(b) by 88 days.

(21) Appl. No.: 13/679,105

(22) Filed: Nov. 16, 2012

(65) Prior Publication Data

US 2013/0134759 A1    May 30, 2013

(30) Foreign Application Priority Data

Nov. 25, 2011    (JP) ................................. 2011-258024

(51) Int. Cl.
*B60N 2/02* (2006.01)
*F16H 3/44* (2006.01)

(52) U.S. Cl.
USPC ......... 297/362; 297/342; 297/361.1; 475/331

(58) Field of Classification Search
USPC ........... 297/342, 362, 361.1; 475/331; 74/409
See application file for complete search history.

(56) References Cited

U.S. PATENT DOCUMENTS

| | | | | |
|---|---|---|---|---|
| 5,462,498 A * | 10/1995 | Lindblad | ...................... | 475/342 |
| 6,305,748 B1 * | 10/2001 | Ohba | ............................ | 297/362 |
| 6,402,248 B1 * | 6/2002 | Lloyd et al. | .................... | 297/362 |
| 7,461,899 B2 * | 12/2008 | Seibold | ...................... | 297/367 R |
| 8,100,478 B2 * | 1/2012 | Ellison | .......................... | 297/341 |
| 8,672,796 B2 * | 3/2014 | Schulz et al. | ................. | 475/323 |
| 8,702,998 B1 * | 4/2014 | Guerini | ............................ | 216/13 |
| 2003/0200627 A1 | 10/2003 | Becker et al. | | |
| 2011/0169313 A1 | 7/2011 | Schulz et al. | | |

FOREIGN PATENT DOCUMENTS

JP    5-1335    1/1993

* cited by examiner

*Primary Examiner* — Jeanette E. Chapman
(74) *Attorney, Agent, or Firm* — Gerald E. Hespos; Michael J. Porco; Matthew T. Hespos

(57) ABSTRACT

Disclosed is a reclining mechanism comprising: a first plate fixed to a seat back; a second plate fixed to a seat cushion; a plurality of planetary gears in meshing engagement with internal gears of the first and second plates; a sun gear in meshing engagement with the planetary gears; and a holding member rotatably holding the planetary gears. An inclined wall portion of the holding member, and an inner peripheral wall of a concave portion of the second plate, define therebetween a wedge-shaped space in which a restriction member is displaceably disposed. The inclined wall portion of the holding member is formed such that a width of the wedge-shaped space is gradually narrowed toward a counter direction opposite to a specific direction along which the first plate is urged to be rotated according to a force applied to the seat back in a rearward tilting direction.

6 Claims, 23 Drawing Sheets

X ←→ Y

X ←→ Y

RECLINING MECHANISM

TECHNICAL FIELD

The present invention relates to a reclining mechanism for a seat such as a vehicle seat.

BACKGROUND ART

Heretofore, there has been known a reclining mechanism for a seat such as a vehicle seat, as disclosed, for example, in Japanese Utility Model Laid-Open Publication No. 05-001335 (hereinafter referred to as "Patent Document 1"). A reclining mechanism disclosed in the Patent Document 1 comprises: a base plate (first plate) and an arm plate (second plate) coaxially supported in a rotatable manner and formed, respectively, with two opposed circular holes having an internal gear (internally-toothed gear) section thereinside; a control gear provided on a rotary shaft of the two plates; a plurality of planetary gears arranged in meshing engagement with the internal gear section of the plates and the control gear, and each protrudingly provided with a boss portion at an axis thereof; and a holding member rotatably holding each of the planetary gears at a trajectory of revolution thereof. This holding member is composed of a spring member which is adapted to contact the respective boss portions of the planetary gears while permitting a rotation thereof, and bias each of the planetary gears in a radial direction (in a direction causing the planetary gear to be brought in meshing engagement with the internal gear section of the plates. This reclining mechanism can suppress wobbling due to backlash between the internal gear section of the two plates (base and arm plates) and each of the planetary gears, etc.

However, even in the case where the planetary gears are biased by the holding member composed of a spring member as described in the Patent Document 1, for example, when a force equal to or greater than a biasing force of the holding member is applied to a seat back, the planetary gears are likely to be displaced radially inwardly against the biasing force of the holding member, causing wobbling between the internal gear section of the plates and each of the planetary gears. On the other hand, if the biasing force of the holding member is increased, a rotational resistance of each of the planetary gears becomes larger, precluding smooth rotation thereof. As above, the technique using the holding member composed of a spring member as in the Patent Document 1 has a problem of being unable to sufficiently suppress wobbling between the internal gear section of the plates and each of the planetary gears.

Moreover, in the reclining mechanism disclosed in the Patent Document 1, when a force is repeatedly applied to the seat back in a rearward tilting direction thereof, each of the planetary gears is likely to being slightly rollingly displaced with respect to the internal gear section of the plates. If this situation occurs, the seat back will be gradually tilted rearwardly with respect to a seat cushion, thereby making it impossible to maintain the seat back in a fixed state.

SUMMARY OF THE INVENTION

It is an object of the present invention to provide a reclining mechanism capable of preventing each planetary gear from being rollingly displaced according to a force repeatedly applied to a seat back in a rearward tilting direction so as to reliably maintain the seat back in a fixed state.

In order to achieve the above object, the present invention provides a reclining mechanism which comprises: a ring-shaped first plate fixed to a seat back; a ring-shaped second plate capable of rotating with respect to the first plate and fixed to a seat cushion; a plurality of planetary gears in meshing engagement with internal gears provided in respective inner peripheries of the first plate and the second plate; a sun gear in meshing engagement with the planetary gears; a holding member rotatably holding the planetary gears; and a restriction member for restricting a rotation of the holding member. The holding member is rotatably disposed in a concave portion formed in a lateral surface of the second plate, and the holding member has an inclined wall portion provided in a part of an outer peripheral surface thereof in spaced-apart opposed relation to an inner peripheral wall of the concave portion. The inclined wall portion of the holding member and the inner peripheral wall of the concave portion define therebetween a wedge-shaped space in which the restriction member is displaceably disposed. The inclined wall portion of the holding member is formed such that a width of the wedge-shaped space is gradually narrowed toward a counter direction with respect to a specific direction, where the specific direction is a direction along which the first plate is urged to be rotated according to a force applied to the seat back in a rearward tilting direction, and the counter direction is a direction opposite to the specific direction.

DESCRIPTION OF EMBODIMENTS

First Embodiment

With reference to FIGS. 1 to FIG. 14, a first embodiment of the present invention will now be described in detail.

Figure 1:
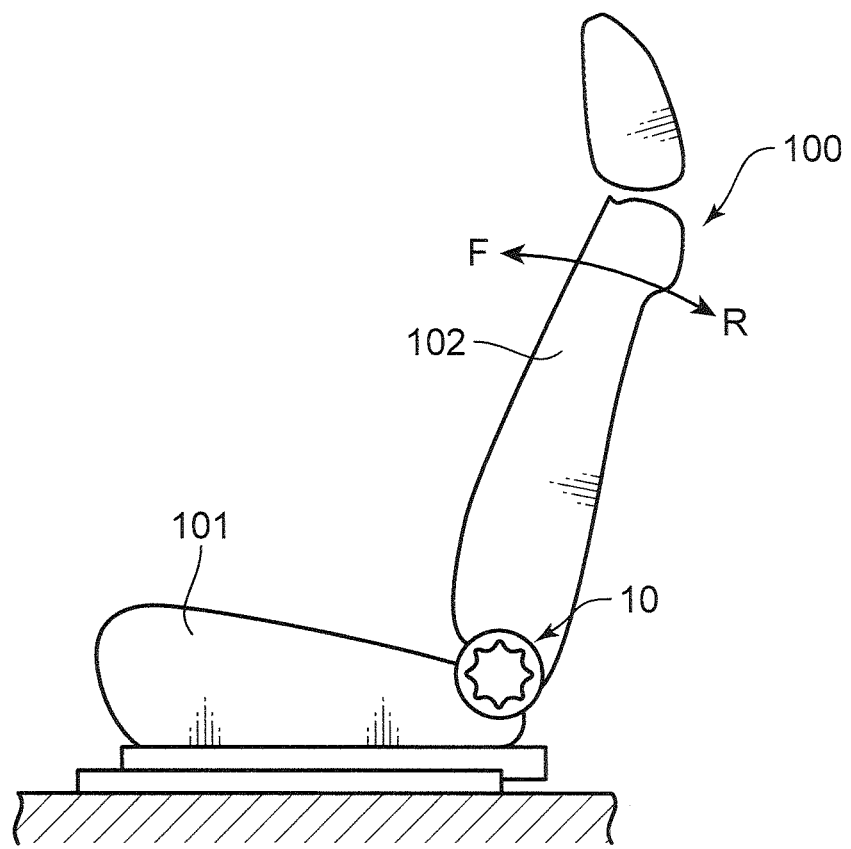
FIG. 1 is a side view of an automobile seat equipped with a reclining mechanism according to a first embodiment of the present invention.

A reclining mechanism 10 according to the first embodiment is designed to be used in an automobile seat 100, as illustrated in FIG. 1. As illustrated in FIGS. 2 to 8, the reclining mechanism 10 comprises: a first plate 1; a second plate 2; a plurality of planetary gears 3; a sun gear 4; a first holding member 5a and a second holding member 5b which hold the planetary gears 3; a rotational operating member 6 for rotationally operating the holding members 5a, 5b; a restriction member 7 for restricting a rotation of the holding members 5a, 5b; and a biasing member 8 biasing the restriction member 7.

The first plate 1 is composed of a ring-shaped plate having a circular hole 11 in a central region thereof. An inner periphery of the first plate 1 surrounding the circular hole 11 is provided with an internal gear (internally-toothed gear) 12 over the entire circumference thereof. In this embodiment, the internal gear 12 of the first plate 1 is composed of thirty-eight teeth.

The first plate 1 has a receiving portion 13 provided in one lateral surface (in FIG. 2, a right surface) thereof. The receiving portion 13 is formed such that a center-side annular region of the one lateral surface of the first plate 1 is concaved by a predetermined depth.

The first plate 1 configured as above is fixedly attached to a seat back 102 (see FIG. 1) of the seat 100.

The second plate 2 is composed of a ring-shaped plate formed in approximately the same shape as that of the first plate 1 to have a circular hole 21 in a central region thereof. An inner periphery of the second plate 2 surrounding the circular hole 21 is provided with an internal gear (internally-toothed gear) 22 over the entire circumference thereof. In this embodiment, the internal gear 22 of the second plate 2 is composed of thirty-five teeth.

The second plate 2 has a concave portion 23 provided in one lateral surface (in FIG. 2, a right surface) thereof. The concave portion 23 is formed such that a center-side annular region of the one lateral surface of the second plate 2 is concaved by a predetermined depth. The concave portion 23 has a circular inner peripheral wall 23a.

The second plate 2 also has a fitting portion 24 provided in the other lateral surface (in FIG. 2, a left surface) thereof. The fitting portion 24 is formed such that a center-side annular region of the other lateral surface of the second plate 2 is convexed by a predetermined distance. The fitting portion 24 is adapted to be rotatably fitted in the receiving portion 13 of the first plate 1.

When the fitting portion 24 of the second plate 2 is fitted into the receiving portion 13 of the first plate 1, the internal gear 12 of the first plate 1 and the internal gear 22 of the second plate 2 are superposed together while aligning the centers thereof with each other.

The second plate 2 configured as above is fixedly attached to a seat cushion 101 (see FIG. 1) of the seat 100.

In this embodiment, the plurality of planetary gears 3 consist of three planetary gears each having the same configuration. Each of the planetary gears 3 has a gear section 31 consisting of ten teeth, in an outer periphery thereof. Each of the planetary gears 3 also has a shaft portion 32 provided at a central region to protrude toward respective opposite sides in an axial direction thereof.

As illustrated in FIGS. 5 to 8, the gear section 31 of each of the three planetary gears 3 is in meshing engagement with both of the internal gear 12 of the first plate 1 and the internal gear 22 of the second plate 2. As the first holding member 5a is rotated, each of the planetary gears 3 is displaced (revolved) in a circumferential direction of the first and second plates 1, 2 while being rotated about the shaft portion 32 thereof (rotated on its own axis).

The first holding member 5a is equivalent to a "holding member" set forth in the appended claims, and disposed on one side (in FIG. 2, the right side) of each of the planetary gears 3 in the axial direction. The second holding member 5b is disposed on the other side (in FIG. 2, the left side) of each of the planetary gears 3 in the axial direction. The first holding member 5a and the second holding member 5b are coupled together by three coupling members 52a arranged in a circumferential direction thereof.

Figure 4:
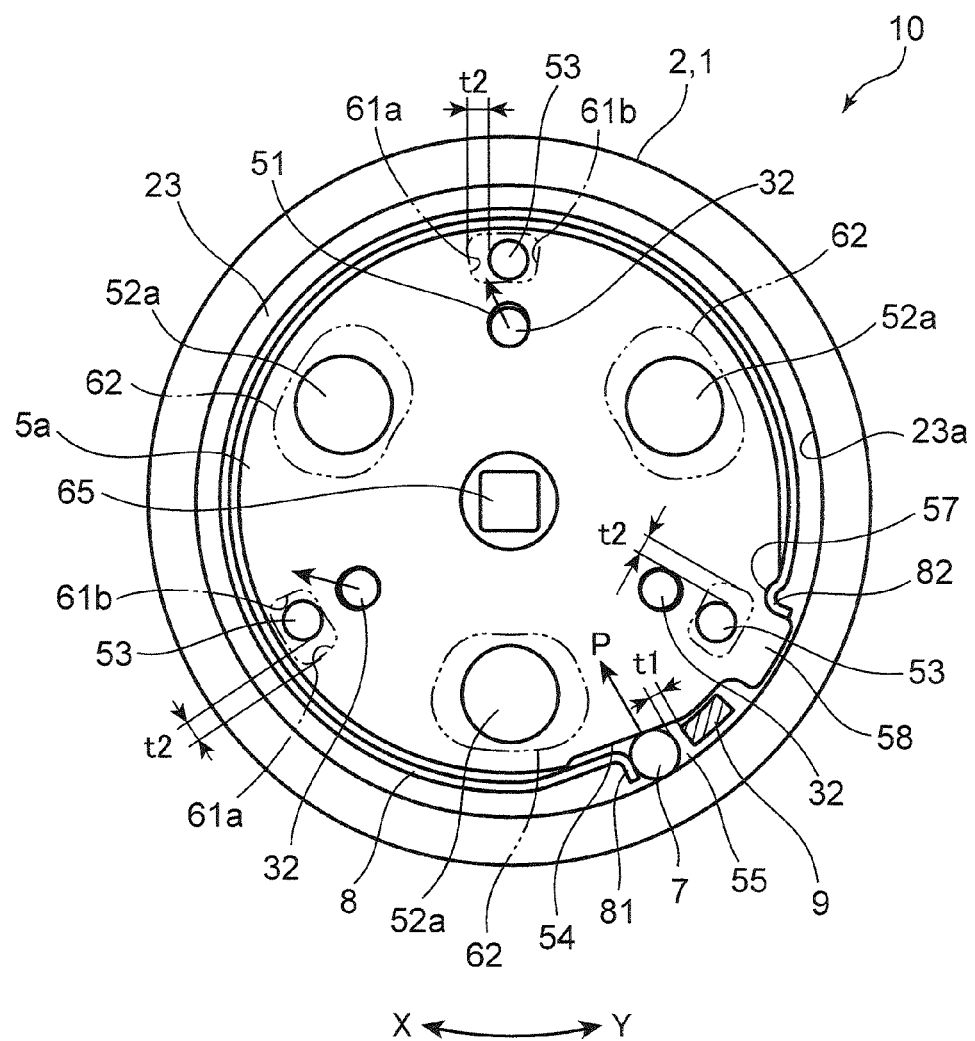
FIG. 4 is a plan view illustrating a state in which a rotational operating member is removed from the state in FIG. 3.
Figure 5:
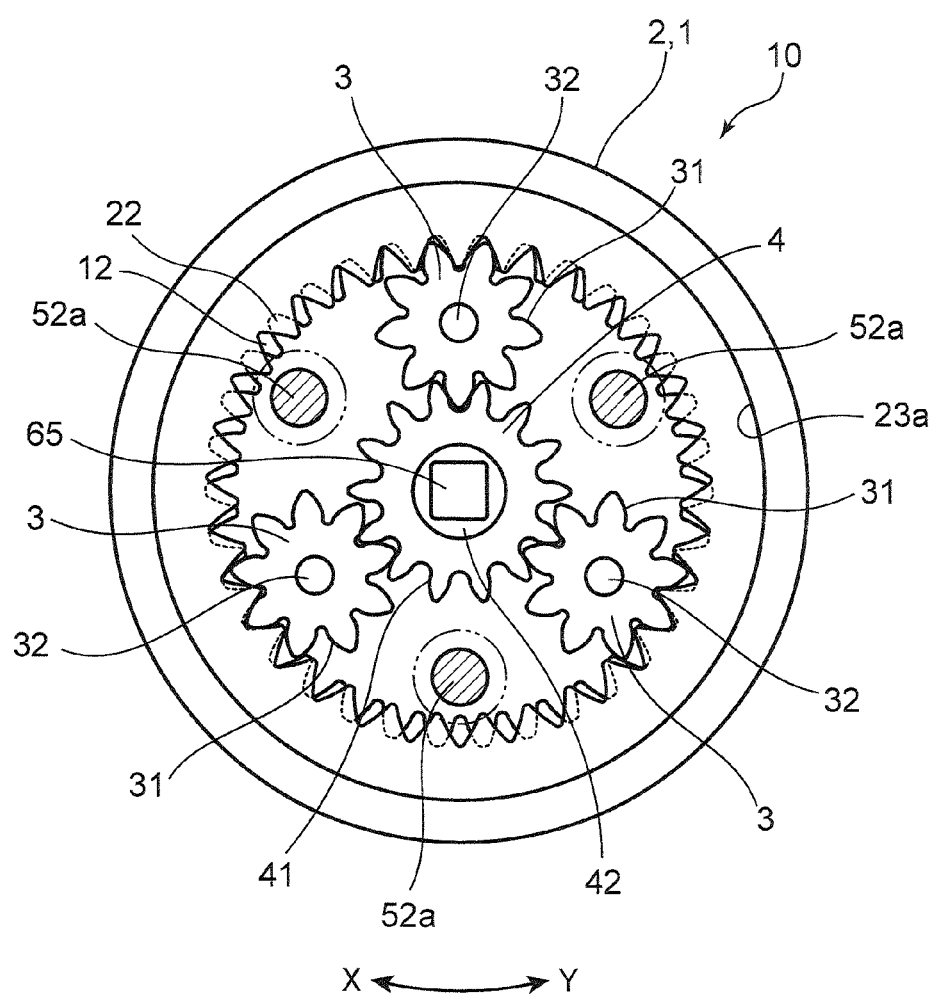
FIG. 5 is a plan view illustrating a state in which a holding member is removed from the state in FIG. 4.
Figure 6:
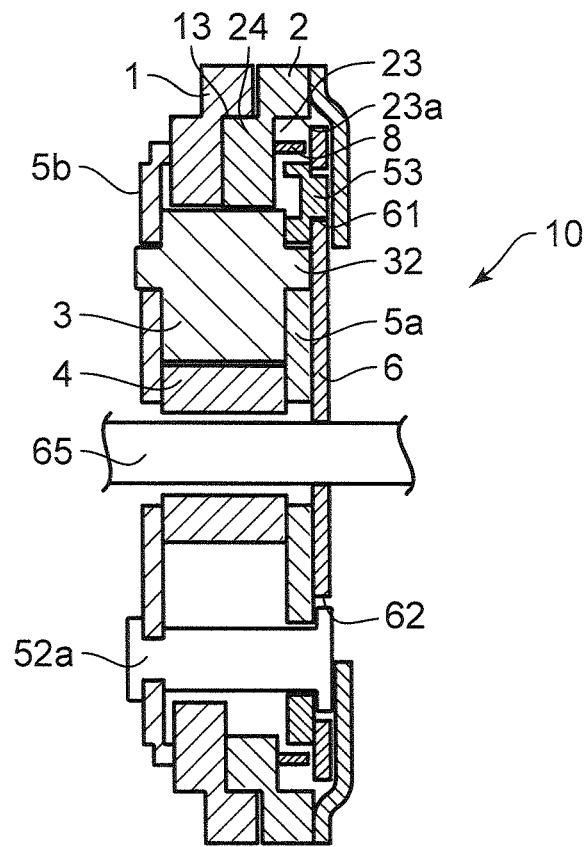
FIG. 6 is a sectional view taken along the line VI-VI in FIG. 3.
Figure 7:
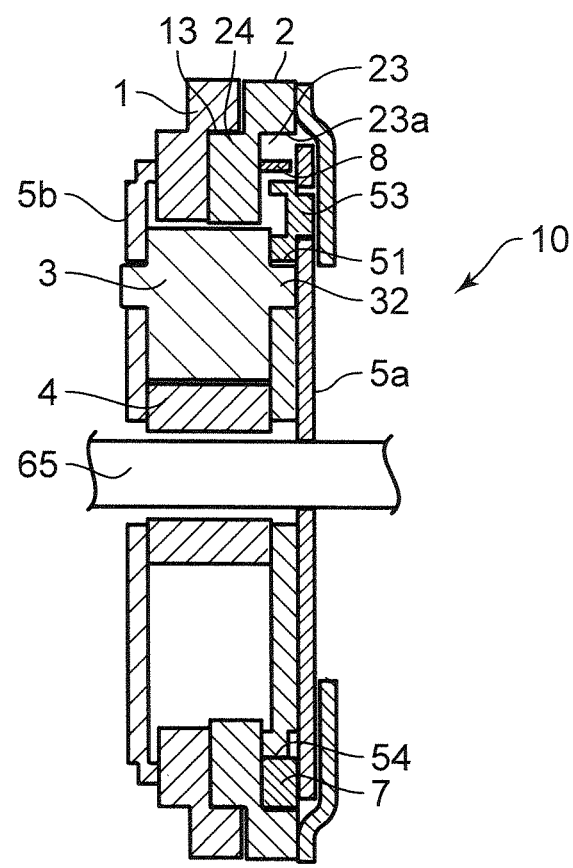
FIG. 7 is a sectional view taken along the line VII-VII in FIG. 3.
Figure 10:
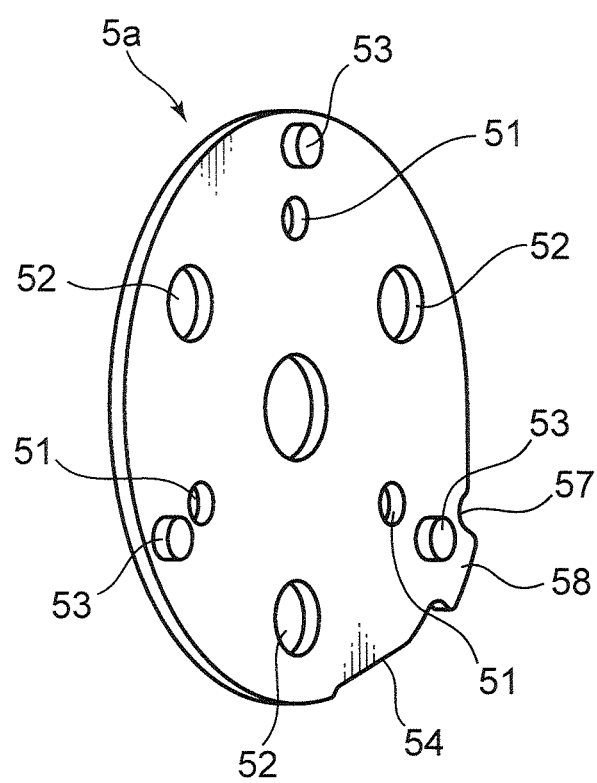
FIG. 10 is a perspective view illustrating the holding member by itself.

As illustrated in FIGS. 4 and 10, the first holding member 5a is composed of an approximately circular disk-shaped plate which has three shaft holding holes 51 for holding the respective shaft portions 32 of the planetary gears 3, three coupling holes 52 for allowing the respective coupling members 52a to be inserted thereinto, and three protruding pieces 53 for receiving a rotational force of the rotational operating member 6. The first holding member 5a has an outer peripheral surface provided with an inclined wall portion 54 which defines an aftermentioned wedge-shaped space 55 in cooperation with the inner peripheral wall 23a of the concave portion 23 of the second plate 2, and a locking portion 57 for locking the biasing member 8.

The three shaft holding holes 51 are arranged at even intervals along a pitch circle having a predetermined radius from a center of the first holding member 5a. The three coupling holes 52 are arranged along a pitch circle having approximately the same radius as that of the pitch circle of the shaft holding holes 51. Each of the coupling holes 52 is located between adjacent two of the shaft holding holes 51.

The three protruding pieces 53 are provided on one lateral surface (in FIG. 2, a right surface) of the first holding member 5a. Each of the protruding pieces 53 is located radially outward of a respective one of the shaft holding holes 51, and provided to protrude toward the rotational operating member 6 (in FIG. 2, the right side) by a predetermined distance.

The inclined wall portion 54 is provided by obliquely cutting a part of the outer peripheral surface of the first holding member 5a. In a state in which the first holding member 5a is received in the concave portion 23 of the second plate 2, the inclined wall portion 54 is provided in spaced-apart opposed relation to the inner peripheral wall 23a of the concave portion 23.

The locking portion 57 is provided by slightly concaving a region of the outer peripheral surface of the first holding member 5a adjacent to the inclined wall portion 54, radially inwardly. A protruding portion 58 is formed between the locking portion 57 and the inclined wall portion 54 to protrude radially outwardly with respect to them.

Figure 2:
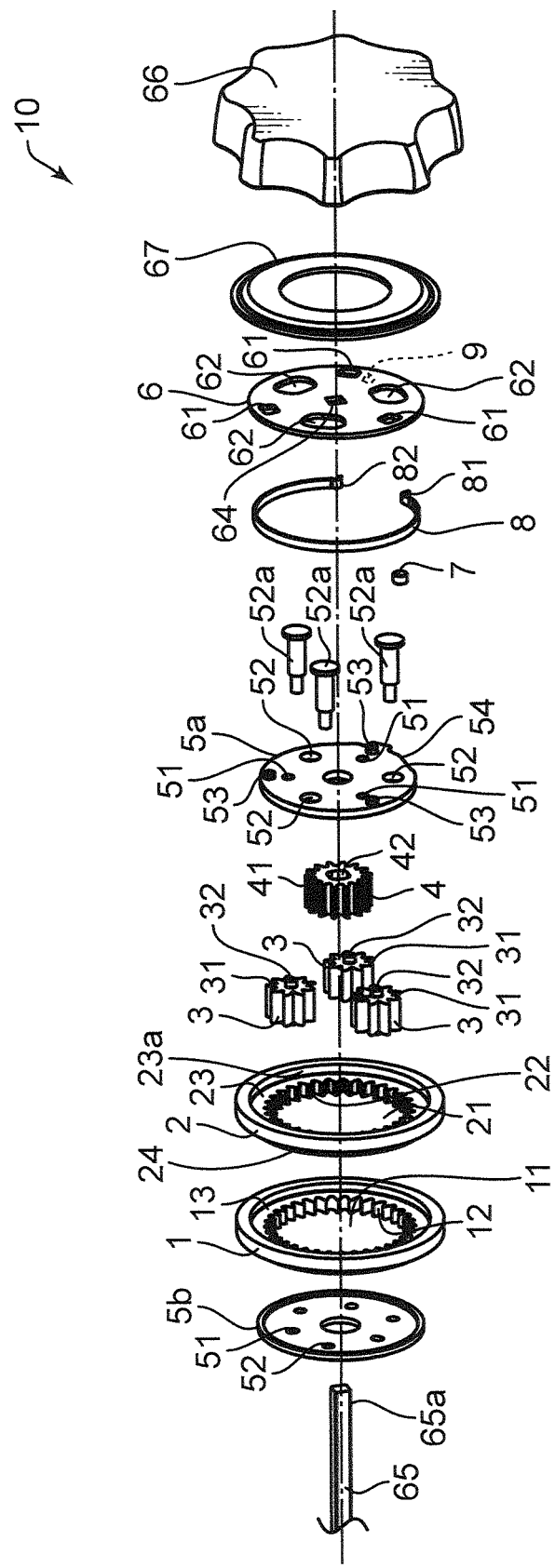
FIG. 2 is an exploded perspective view illustrating a structure of a substantial part of the reclining mechanism according to the first embodiment.
Figure 3:
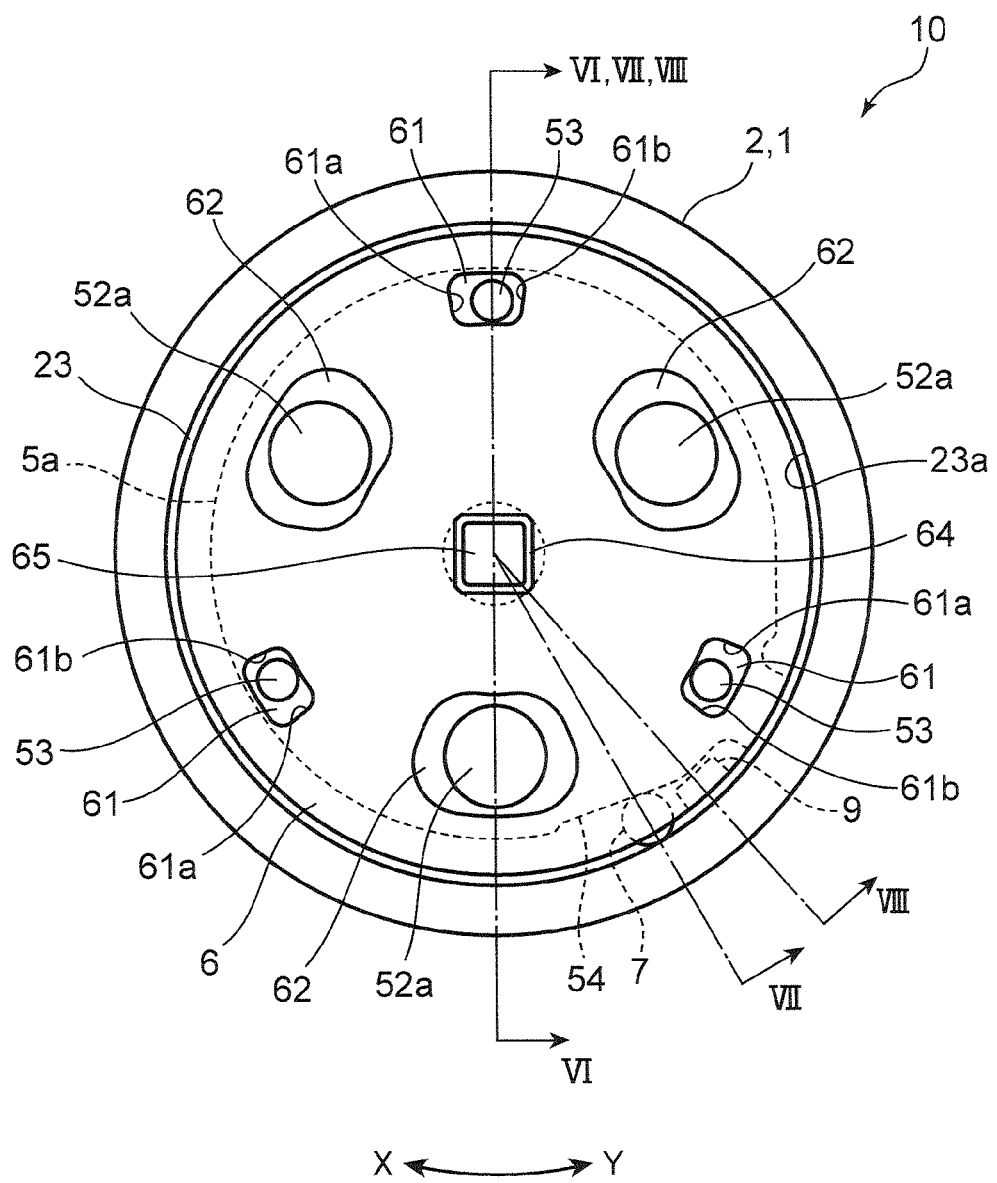
FIG. 3 is a plan view illustrating the structure of the substantial part of the reclining mechanism according to the first embodiment.

As illustrated in FIG. 2, the second holding member 5b has a structure similar to that of the first holding member 5a. However, differently from the first holding member 5a, the second holding member 5b is devoid of the protruding pieces 53 and the inclined wall portion 54.

As illustrated in FIGS. 4 and 6 to 8, the first holding member 5a configured as above is rotatably received in the concave portion 23 of the second plate 2. On the other hand, the second holding member 5b is attached to the other lateral surface (in FIG. 2, a left surface) of the first plate 1. In this state, the shaft portions 32 of the planetary gears 3 are inserted into respective ones of the shaft holding holes 51 of the first holding member 5a (and respective ones of similar shaft holding holes of the second holding member 5b) and rotatably held by them. Further, the coupling members 52a are inserted into respective ones of the coupling holes 52 of the first holding member 5a (and respective ones of similar coupling holes of the second holding member 5b), so that the first holding member 5a and the second holding member 5b are coupled together through the coupling members 52a.

The inclined wall portion 54 formed in the outer peripheral surface of the first holding member 5a, and the inner peripheral wall 23a of the concave portion 23 of the second plate 2, define therebetween a wedge-shaped space 55 as illustrated in FIG. 4. The restriction member 7 is displaceably disposed in the wedge-shaped space 55.

Figure 11:
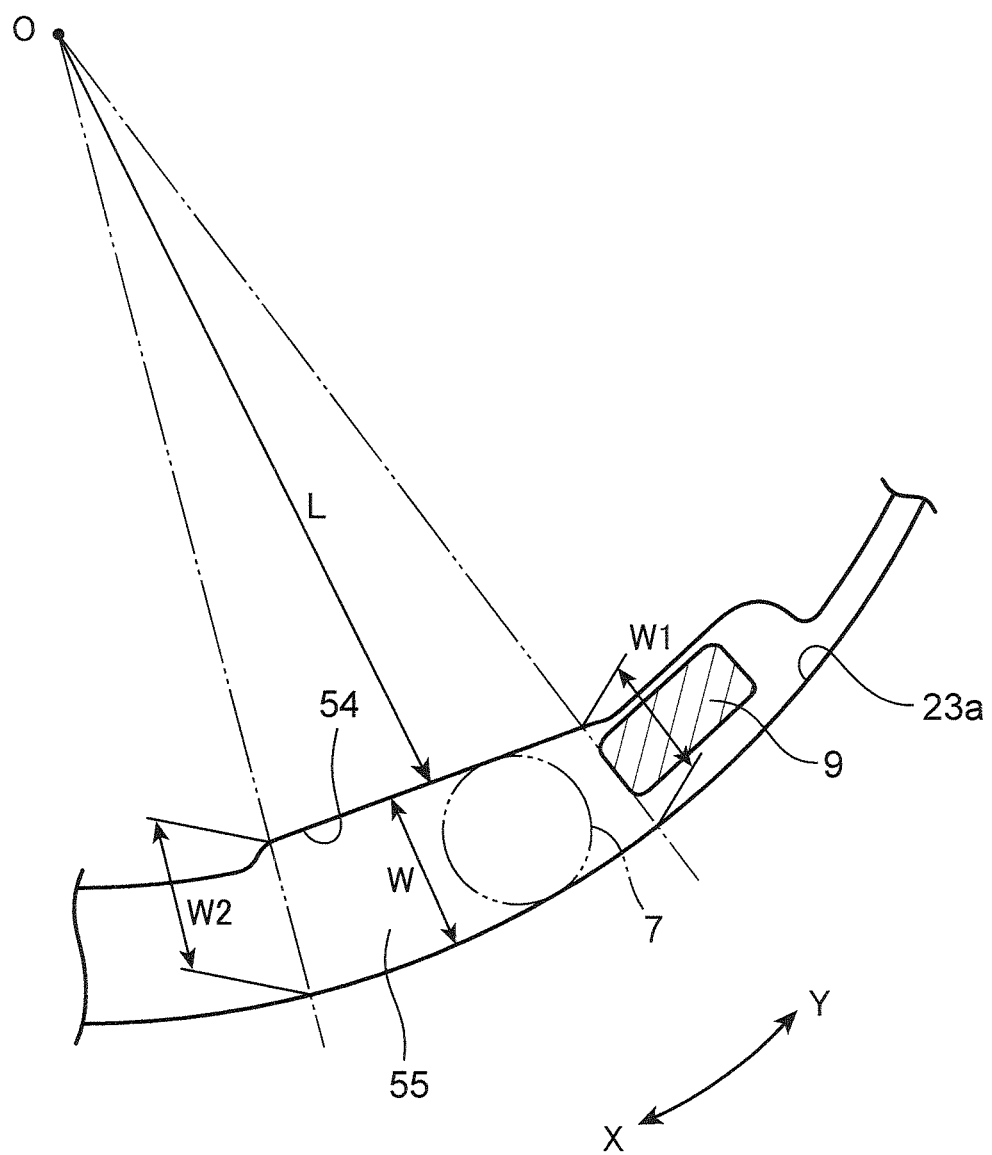
FIG. 11 is an explanatory view enlargedly illustrating a shape of a wedge-shaped space in FIG. 4.
Figure 12:
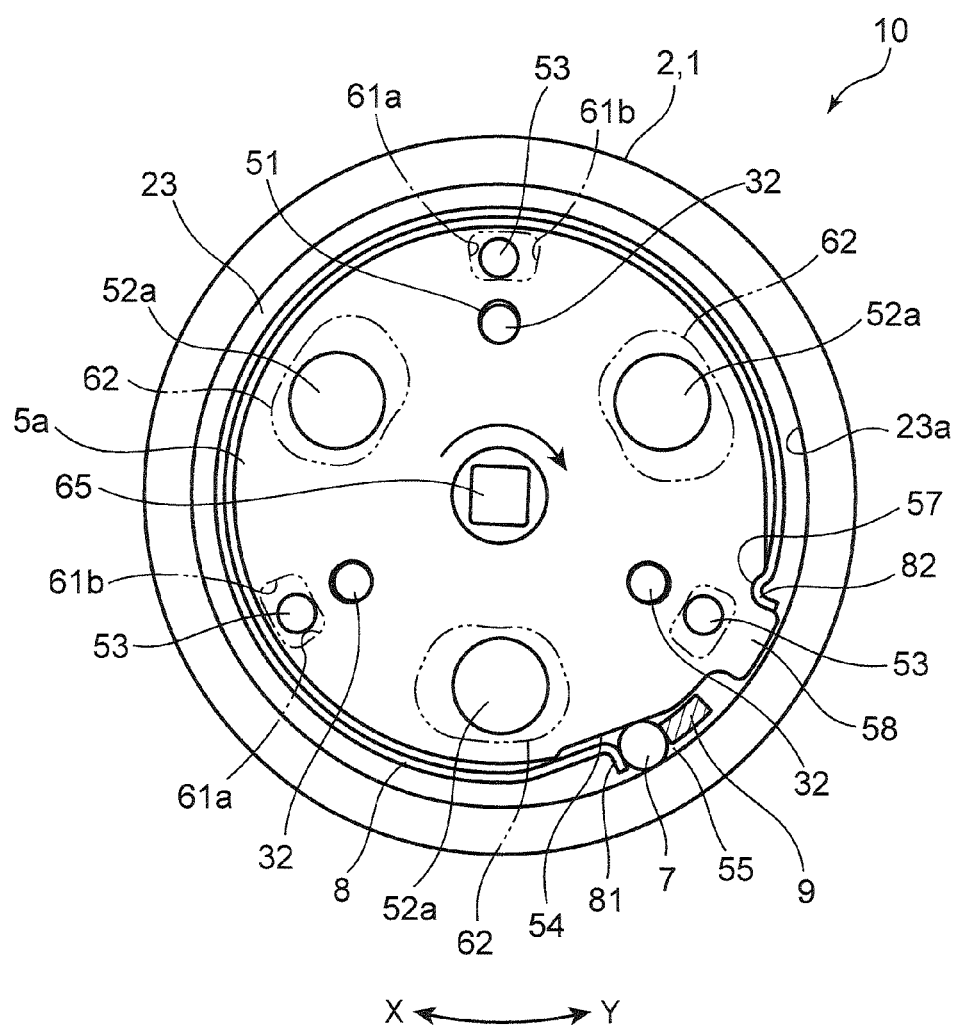
FIG. 12 is an explanatory view illustrating a state in which the rotational operating member is rotated from the state in FIG. 4 in a specific direction and thereby a restriction releasing portion is brought into contact with a restriction member.

FIG. 11 illustrates a shape of the wedge-shaped space 55 in detail. As also illustrated in FIG. 11, a width W of the wedge-shaped space 55, i.e., a radial distance between the inclined wall portion 54 of the first holding member 5a and the inner peripheral wall 23a of the concave portion 23 is set to gradually become narrowed toward a counterclockwise direction.

The counterclockwise direction in FIGS. 11 and 3 to 5 is a direction opposite to a direction along which the first plate 1 is urged to be rotated when a force in a rearward tilting direction R (see FIG. 1) is applied to the seat back 102. In the following description, the direction along which the first plate 1 is urged to be rotated when the force in the rearward tilting direction R is applied to the seat back 102 (in FIG. 11, a clockwise direction) will be referred to as "specific direction X", and a direction opposite to the specific direction (in FIG. 11, a counterclockwise direction) will be referred to as "counter direction Y".

Assuming that the rotational direction is defined as above, the width W of the wedge-shaped space 55 is gradually narrowed toward the counter direction Y, and, on the other hand, it is gradually widened toward the specific direction X. That is, the inclined wall portion 54 of the first holding member 5a is inclined in such a manner that a radial distance L from the center of the first holding member 5a is gradually reduced toward the specific direction X so as to allow the wedge-shaped space 55 having the above shape to be defined.

The sun gear 4 will be described below. As illustrated in FIG. 2, the sun gear 4 has a gear section 41 consisting of sixteen teeth, in an outer periphery thereof. The sun gear 4 also has a shaft insertion hole 42 axially penetrating therethrough.

Then, as illustrated in FIGS. 5 to 8, the sun gear 4 is provided between the first holding member 5a and the second holding member 5b in a coaxial relation to each other. The three planetary gears 3 are arranged around the sun gear 4 to surround the sun gear 4, and the gear section 41 of the sun gear 4 and the gear section 31 of each of the planetary gears 3 are brought into meshing engagement with each other. Thus, when the sun gear 4 is rotated, each of the planetary gears 3 is moved (revolved) in the circumferential direction while being rotated about the shaft portion 32 thereof (rotated on its own axis), and the first and second holding members 5a, 5b are rotated.

The restriction member 7 will be described below. The restriction member 7 is designed to restrict the first and second holding members 5a, 5b from being rotated in the specific direction X, and displaceably disposed in the wedge-shaped space 55. In this embodiment, the restriction member 7 is composed of a columnar-shaped roller. As illustrated in FIG. 11, an outer diameter thereof is set to be less than a width (maximum width) W2 of an end of the wedge-shaped space 55 on a leading side with respect to the specific direction X, and greater than a width (minimum width) W1 of an end of the wedge-shaped space 55 on a leading side with respect to the counter direction Y.

The rotational operating member 6 will be described below. As illustrated in FIG. 2, the rotational operating member 6 is composed of a circular disk-shaped plate having approximately the same size as that of the first holding member 5a. As primarily illustrated in FIG. 9, the rotational operating member 6 integrally has a restriction releasing portion 9 provided at one position of a peripheral edge thereof. The rotational operating member 6 also has three coupling-member receiving holes 62 arranged in a circumferential direction thereof along a predetermined pitch circle, three protruding-portion receiving holes 61 arranged in the circumferential direction in such a manner as to be located between adjacent ones of the coupling-member receiving holes 62, and a quadrangular-shaped shaft coupling hole 64 provided in a central region of the rotational operating member 6.

As illustrated in FIGS. 3, 4 and 6 to 8, heads of the three coupling members 52a coupling the first holding member 5a and the second holding member 5b are received in respective ones of the three coupling-member receiving holes 62. The three protruding pieces 53 protrudingly provided on the one lateral surface of the first holding member 5a (surface on the side of the rotational operating member 6) are received in respective ones of the three protruding-portion receiving holes 61.

When the rotational operating member 6 is rotated, an inner peripheral surface of each of the protruding-portion receiving holes 61 is brought into contact with a respective one of the protruding pieces 53 of the first holding member 5a, to push them in the circumferential direction. According to the pushing of the protruding pieces 53, the first holding member 5a is rotated, and the second holding member 5b is rotated through the coupling members 52a.

The above rotational operation of the first holding member 5a (and the second holding member 5b) by the rotational operating member 6 can be performed both in the specific direction X and the counter direction Y. In the following description, a portion of the rotational operating member 6 adapted to push each of the protruding pieces 53 during rotation of the rotational operating member 6 in the specific direction X, i.e., a wall surface of each of the protruding-portion receiving holes 61 on a leading side with respect to the counter direction Y, will be referred to as "first push-operation portion 61a", and a portion of the rotational operating member 6 adapted to push each of the protruding pieces 53 during rotation of the rotational operating member 6 in the counter direction Y, i.e., a wall surface of each of the protruding-portion receiving holes 61 on a leading side with respect to the specific direction X, will be referred to as "second push-operation portion 61b". That is, the rotational operating member 6 has a first push-operation portion 61a for pushing and rotating the first holding member 5a in the specific direction X, and a second push-operation portion 61b for pushing and rotating the first holding member 5a in the counter direction Y.

Figure 8:
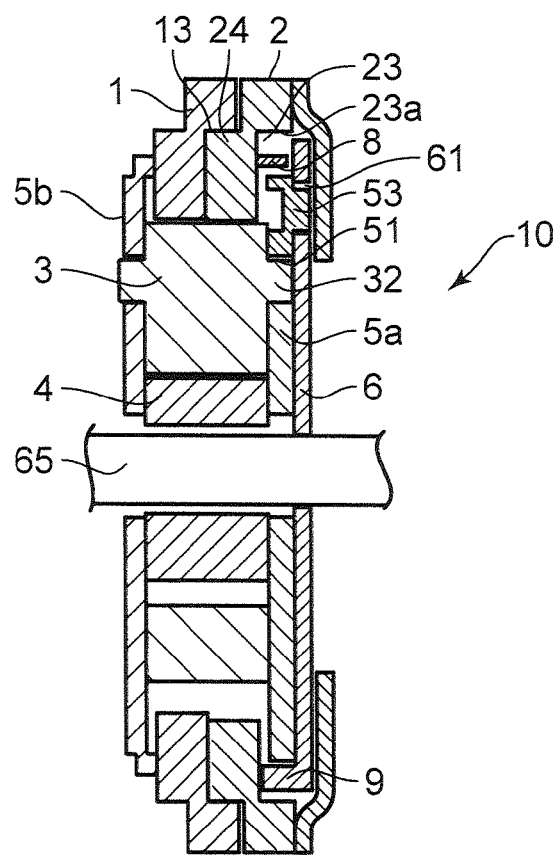
FIG. 8 is a sectional view taken along the line VIII-VIII in FIG. 3.
Figure 9:
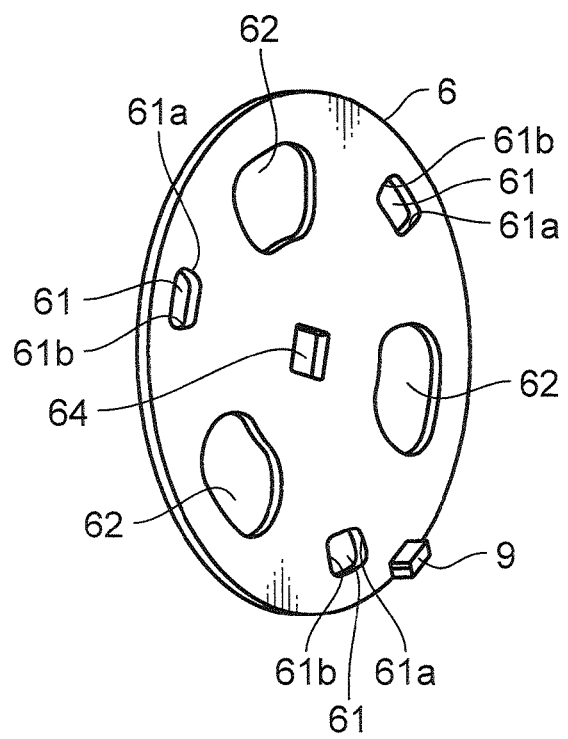
FIG. 9 is a perspective view illustrating the rotational operating member by itself.

The restriction releasing portion 9 is a member for releasing the restriction by the restriction member 7, and composed of a plate-shaped piece protruding from the surface of the rotational operating member 6 facing the first holding member 5a, at a position of the peripheral edge thereof, by a predetermined distance, as illustrated in FIGS. 2, 8 and 9.

As illustrated in FIG. 4, the restriction releasing portion 9 is disposed in a circumferentially displaceable manner, at a position adjacent to the restriction member 7 within a gap between the outer peripheral surface of the first holding member 5a and the inner peripheral wall 23a of the concave portion 23. More specifically, the restriction releasing portion 9 is disposed within the gap at a position corresponding to an area between the inclined wall portion 54 and the protruding portion 58 of the first holding member 5a, and on a side opposite to an aftermentioned pushing piece 81 of the biasing member 8 across the restriction member 7.

Further, the restriction releasing portion 9 is disposed at a position where a predetermined gap t1 is ensured with respect to the restriction member 7. This gap t1 is set to become less than a gap t2 set between corresponding ones of the first push-operation portions 61a of the rotational operating member 6 and the protruding pieces 53.

The rotational operating member 6 configured as above is non-rotatably coupled to a manual operation dial 66 through an aftermentioned rotary shaft 65.

Specifically, a square pillar-shaped rotary shaft 65 is disposed in a coupling portion between the seat back 102 and a seat cushion 101 of the seat 100, rotatably with respect to the seat back 102 and a seat cushion 101. As illustrated in FIG. 2, the rotary shaft 65 has a first end 65a which is rotatably inserted into the second holding member 5b, the circular hole 11 of the first plate 1, the circular hole 21 of the second plate 2, the shaft insertion hole 42 of the sun gear 4, and the first holding member 5a, in this order. Further, the first end 65a of the rotary shaft 65 inserted in the above members is non-rotatably fitted into the shaft coupling hole 64 of the rotational operating member 6. Thus, the rotary shaft 65 is disposed in a freely relatively rotatable manner with respect to the second holding member 5b, the first plate 1, the second plate 2, the sun gear 4 and the first holding member 5a, and in a relatively non-rotatable manner with respect to the rotational operating member 6.

The first end 65a of the rotary shaft 65 fitted in the shaft coupling hole 64 of the rotational operating member 6 is coupled to the manual operation dial 66 illustrated in FIG. 2, in a relatively non-rotatable manner. Therefore, according to rotation of the manual operation dial 66, the rotary shaft 65 is rotated, and, according to this rotation, the rotational operating member 6 is rotated. As illustrated in FIG. 2, a ring-shaped cover 67 is provided between the manual operation dial 66 and the rotational operating member 6.

The biasing member 8 will be described below. As illustrated in FIGS. 2 and 4, the biasing member 8 is composed of an open ring-shaped member which has one end provided with a pushing piece 81 for pushing the restriction member 7, and the other end provided with a lockable portion 82 adapted to be locked by the locking portion 57 of the first holding member 5a.

The pushing piece 81 is formed by bending one end of the biasing member 8 radially outwardly, as illustrated in FIG. 4. The lockable portion 82 is formed by bending the other end of the biasing member 8 in an arc shape.

The biasing member 8 is disposed along the circumferential direction within a gap between the outer peripheral surface of the first holding member 5a and the inner peripheral wall 23a of the concave portion 23. In this state, the pushing piece 81 at the one end of the biasing member 8 is in contact with the restriction member 7, and the lockable portion 82 at the other end of the biasing member 8 is fitted in and locked by the locking portion 57 of the first holding member 5a. In this manner, the pushing piece 81 of the biasing member 8 pushes the restriction member 7 in the counter direction Y within the wedge-shaped space 55.

An operation of the reclining mechanism 10 configured as above will described below.

When a force in the rearward tilting direction R as illustrated in FIG. 1 is applied to the seat back 102 of the seat 100 incorporating the reclining mechanism 10, a force is applied to the first plate 1 fixed to the seat back 102 to urge the first plate 1 to be rotated in the specific direction X (In FIG. 4, the clockwise direction). Then, according to the rotational force of the first plate 1, a force causing the planetary gears 3 to be rollingly displaced in the specific direction X, i.e., a force causing the first holding member 5a holding the planetary gears 3 to be rotated in the specific direction X, is generated. This is equivalent to pushing the restriction member 7 toward the counter direction Y (in FIG. 4, the counterclockwise direction) in the wedge-shaped space 55 defined between the inclined wall portion 54 of the first holding member 5a and the inner peripheral wall 23a of the concave portion 23 of the second plate 2. Particularly, in the first embodiment, the restriction member 7 is biased in the counter direction Y by the biasing member 8, so that the restriction member 7 is reliably pushed toward the counter direction Y without being displaced in the specific direction X in conjunction with the above movement.

When the restriction member 7 is relatively pushed toward the counter direction Y (in a direction causing the width W of the wedge-shaped space 55 to become narrower), the restriction member 7 is brought into such a situation that it bites into a narrow region of the wedge-shaped space 55, so that a force P directed toward the center of the first holding member 5a is applied to the inclined wall portion 54 of the first holding member 5a, as illustrated in FIG. 4. The first holding member 5a receiving this force P acts to push the shaft 32 of at least one of the three planetary gears 3 (in FIG. 4, the two shafts 32 of the upper and left lower planetary gears 3) held by the first holding member 5a, radially outwardly with respect to the first plate 1 and the second plate 2.

According to this pushing, the gear section 31 of the planetary gear 3 is pressed against the internal gears 12, 22 of the first and second plates 1, 2, so that a gap corresponding to backlash between the gear section 31 and the internal gears 12, 22 is eliminated. In this state, the planetary gears 3 are precluded from rolling displacement with respect to the internal gears 12, 22 of the first plate 1 and the second plate 2 (i.e., a rotation of the first holding member 5a is restricted), so that it becomes possible to, even if a force in the rearward tilting direction R is repeatedly applied to the seat back 102, reliably maintain the planetary gears 3 and the first holding member 5a in a fixed state and thereby effectively prevent the seat back 102 from being gradually moved in the rearward tilting direction R.

On the other hand, for example, when a seat occupant tilts the seat back 102 rearwardly to an arbitrary angle on his/her own will, he/she grips and rotationally operates the manual operation dial 66 (see FIG. 2) in the specific direction X (in FIG. 4, the clockwise direction).

When the manual operation dial 66 is rotationally operated in the specific direction X, the rotational operating member 6 is rotated in the same direction through the rotary shaft 65. According to this rotation, the restriction releasing portion 9 of the rotational operating member 6 is brought into contact with the restriction member 7, as illustrated FIG. 12. Before the rotational operating member 6 is rotationally operated, the aforementioned dimensional relation t1<t2 is satisfied (see FIG. 4). Thus, at a timing in FIG. 12, each of the first push-operation portions 61a of the rotational operating member 6 has not been brought into contact with a respective one of the protruding pieces 53 of the first holding member 5a. That is, the restriction releasing portion 9 is adapted to be brought into contact with the restriction member 7 before the first push-operation portion 61a pushes the first holding member 5a. Subsequently, when the rotational operating member 6 is further rotated, the restriction releasing portion 9 pushes the restriction member 7 against a biasing force of the biasing member 8 to displace the restriction member 7 in the specific direction X (i.e., a direction causing the width W of the wedge-shaped space 55 to become wider) within the wedge-shaped space 5.

In the above manner, the restriction member 7 is displaced in the specific direction X. As a result, the rotational restriction by the restriction member 7 is released, and the first holding member 5a becomes rotatable with respect to the second plate 2. When the rotational operating member 6 is further rotated in the above restriction released state, each of the first push-operation portions 61a of the rotational operating member 6 is brought into contact with a respective one of the protruding pieces 53 of the first holding member 5a, as illustrated in FIG. 13.

Figure 13:
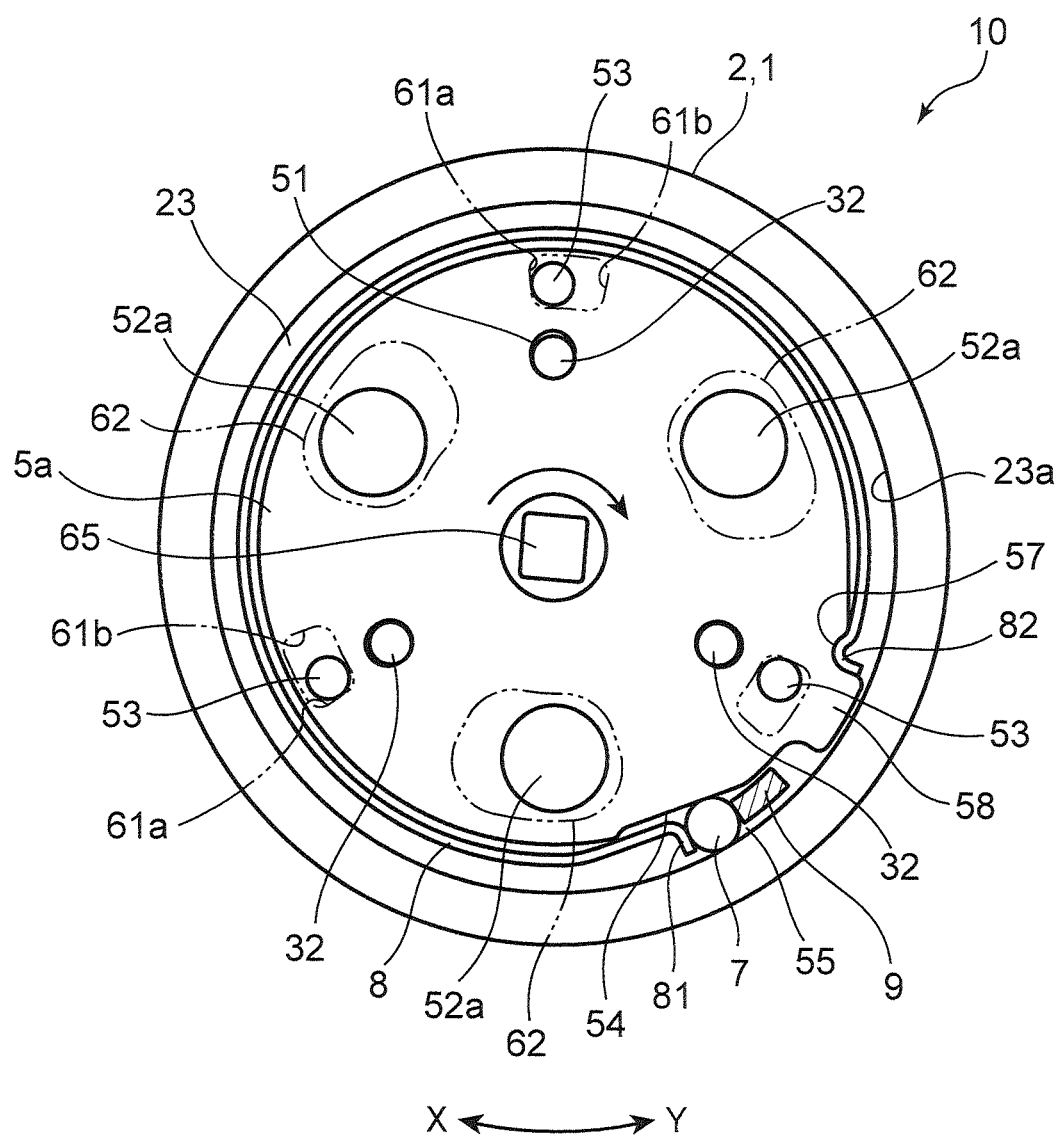
FIG. 13 is an explanatory view illustrating a state in which the rotational operating member is further rotated from the state in FIG. 12 in the specific direction.
Figure 14:
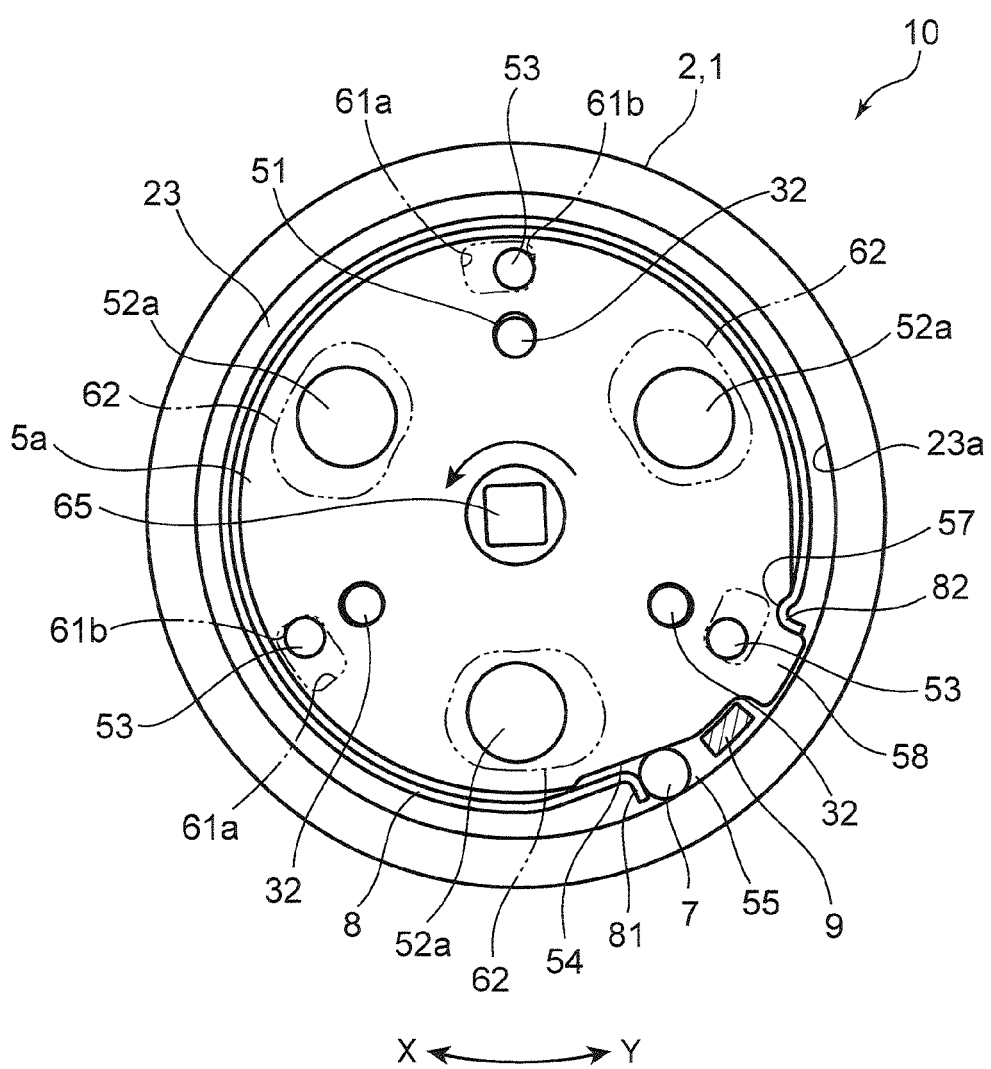
FIG. 14 is an explanatory view illustrating a state in which the rotational operating member is rotated from the state in FIG. 4 in a counter direction.
Figure 15:
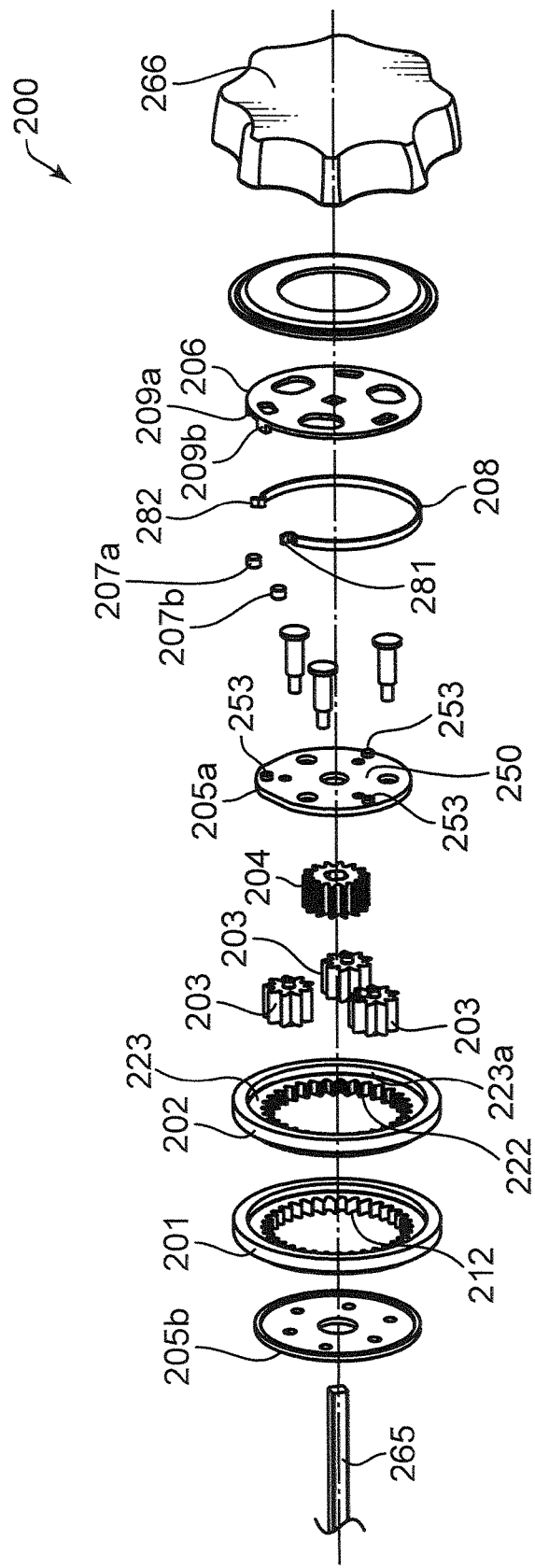
FIG. 15 is an exploded perspective view illustrating a structure of a substantial part of a reclining mechanism according to a second first embodiment of the present invention.
Figure 16:
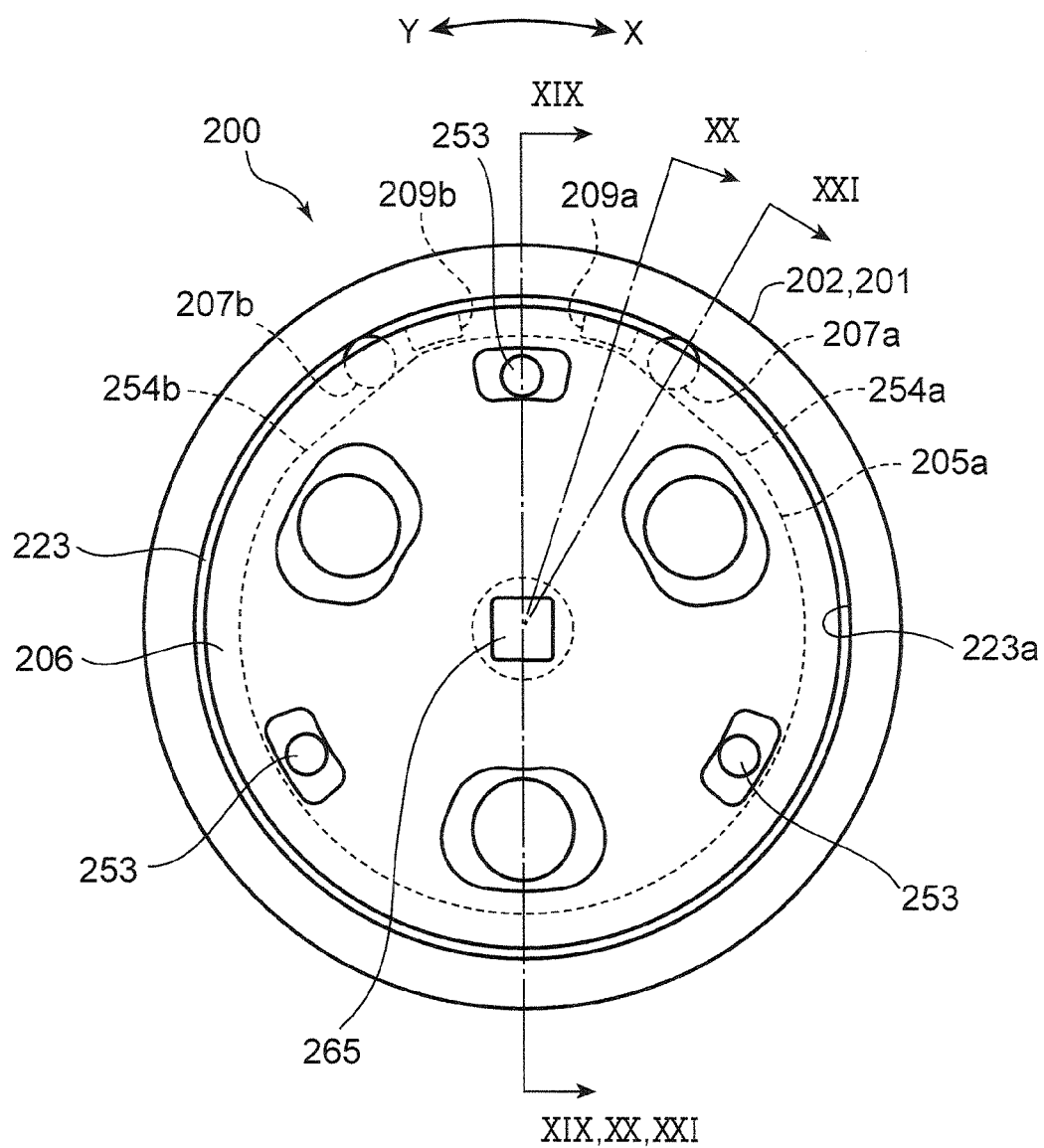
FIG. 16 is a plan view illustrating the structure of the substantial part of the reclining mechanism according to the second embodiment.

When the rotational operating member 6 is further rotated from the state in FIG. 13, the first push-operation portions 61a push the respective protruding pieces 53 of the first holding member 5a in the specific direction X to rotate the first holding member 5a in the specific direction X, under the condition that the restriction released state is maintained.

In the above manner, the first holding member 5a is rotated in the specific direction X. Along with this rotation, the planetary gears 3 are rollingly displaced in the specific direction X along the internal gears 12, 22 of the first plate 1 and the second plate 2. During the displacement, the first plate 1 is relatively rotated with respect to the second plate 2 in the specific direction X, because the number of teeth in the internal gear 12 of the first plate 1 is greater than the number of teeth in the internal gear 22 of the second plate 2, so that the seat back 102 will be displaced in the rearward tilting direction R.

On the other hand, when a seat occupant tilts the seat back 102 forwardly to an arbitrary angle, he/she grips and rotationally operates the manual operation dial 66 (see FIG. 2) in the counter direction Y (in FIG. 4, the counterclockwise direction).

When the manual operation dial 66 is rotationally operated in the counter direction Y, the rotational operating member 6 is rotated in the same direction through the rotary shaft 65. According to this rotation, each of the second push-operation portions 61b of the rotational operating member 6 is brought into contact with a respective one of the protruding pieces 53 of the first holding member 5a, as illustrated FIG. 14, to push the protruding piece 53 in the counter direction Y.

When the first holding member 5a is rotated according to the pushing, the planetary gears 3 are rollingly displaced in the counter direction Y along the internal gears 12, 22 of the first plate 1 and the second plate 2. During the displacement, the first plate 1 is relatively rotated with respect to the second plate 2 in the counter direction Y, because the number of teeth in the internal gear 12 of the first plate 1 is greater than the number of teeth in the internal gear 22 of the second plate 2, so that the seat back 102 will be displaced in a forward tilting direction F.

According to the rotation of the first holding member 5a in the counter direction Y, the restriction member 7 in the wedge-shaped space 55 is relatively displaced in the specific direction X (i.e., a direction causing the width W of the wedge-shaped space 55 to become wider), so that the rotation of the first holding member 5a is never restricted by the restriction member 7.

Second Embodiment

With reference to FIGS. 15 to 25, a second embodiment of the present invention will be described below. Similarly to the aforementioned first embodiment, a reclining mechanism 200 according to the second embodiment comprises: a first plate 201; a second plate 202; a plurality of planetary gears 203; a sun gear 204; a first holding member 205a and a second holding member 205b which hold the planetary gears 203; a rotational operating member 206 for rotationally operating the holding members 205a, 205b; a first restriction member 207a and a second restriction member 207b for restricting a rotation of the holding members 205a, 205b; and a biasing member 208 biasing the first and second restriction members 207a, 207b.

Each of the first plate 201, the second plate 202, the planetary gears 203, the sun gear 204 and the second holding member 205b has the same structure as that of a respective one of the first plate 1, the second plate 2, the planetary gears 3, the sun gear 4 and the second holding member 5b in the first embodiment.

Figure 17:
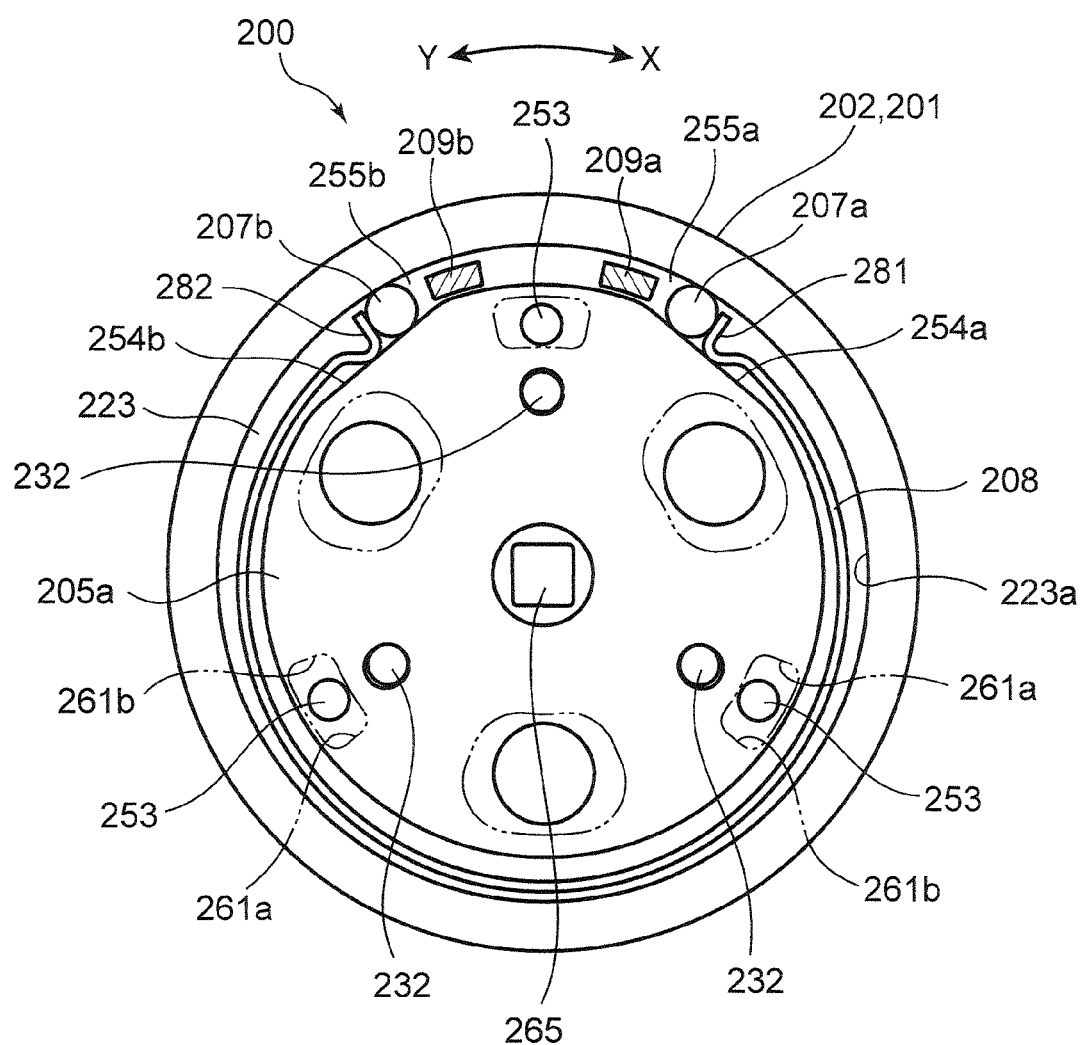
FIG. 17 is a plan view illustrating a state in which a rotational operating member is removed from the state in FIG. 16.
Figure 18:
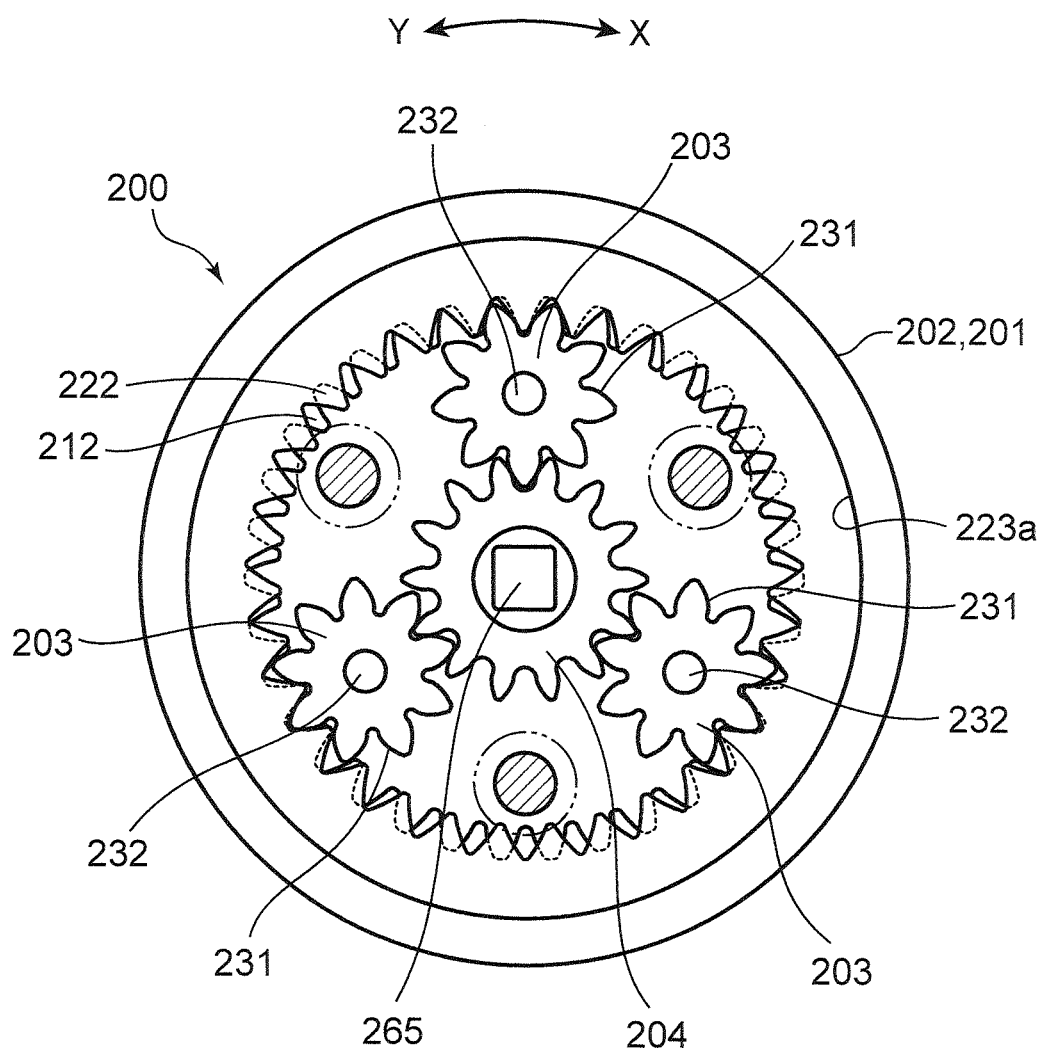
FIG. 18 is a plan view illustrating a state in which a holding member is removed from the state in FIG. 17.
Figure 19:
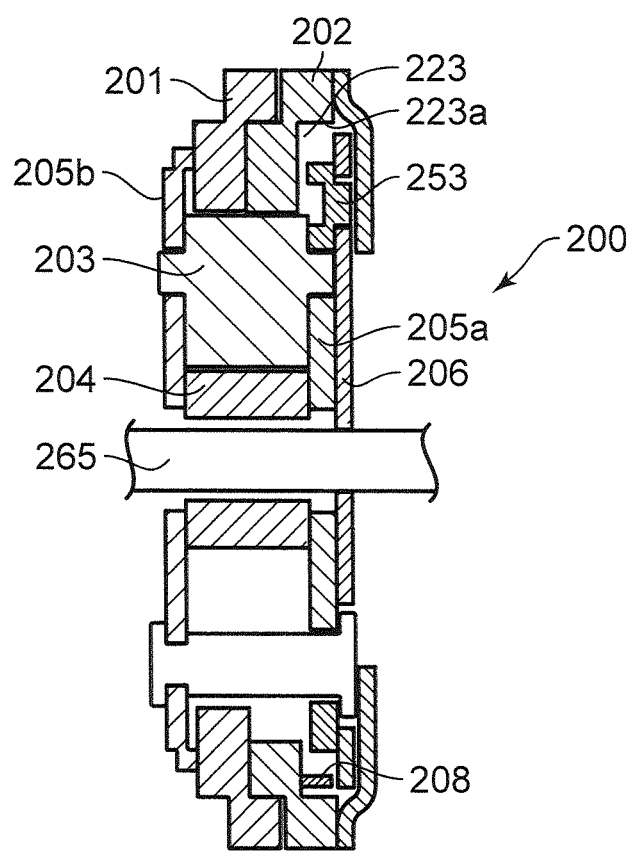
FIG. 19 is a sectional view taken along the line XIX-XIX in FIG. 16.
Figure 20:
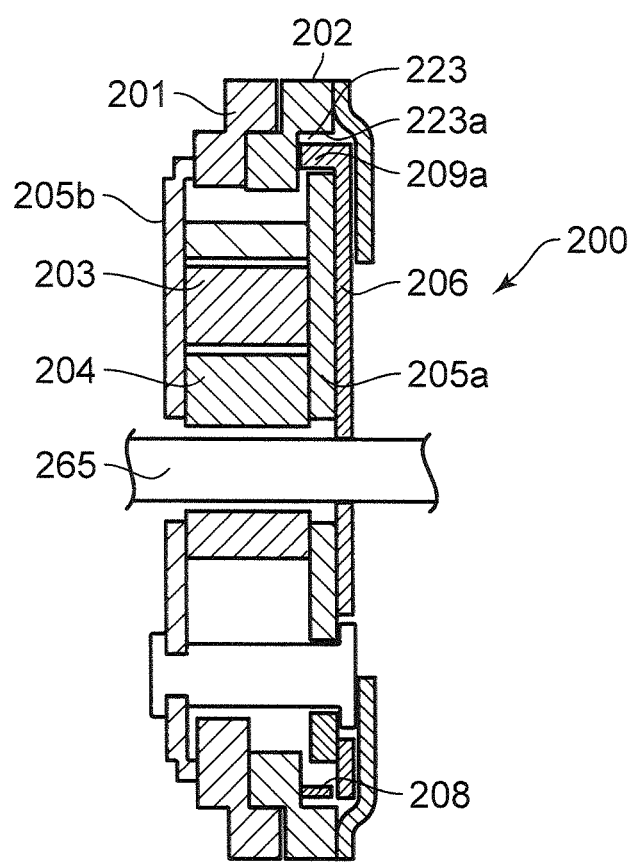
FIG. 20 is a sectional view taken along the line XX-XX in FIG. 16.
Figure 21:
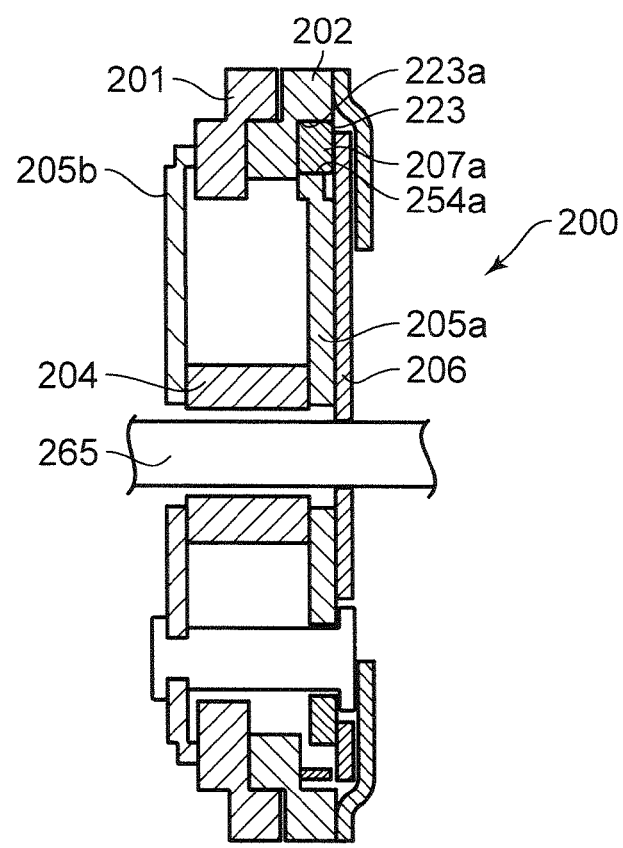
FIG. 21 is a sectional view taken along the line XXI-XXI in FIG. 16.
Figure 22:
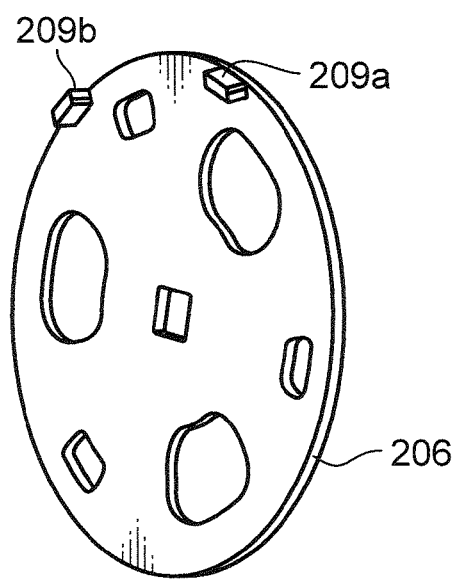
FIG. 22 is a perspective view illustrating the rotational operating member by itself.
Figure 23:
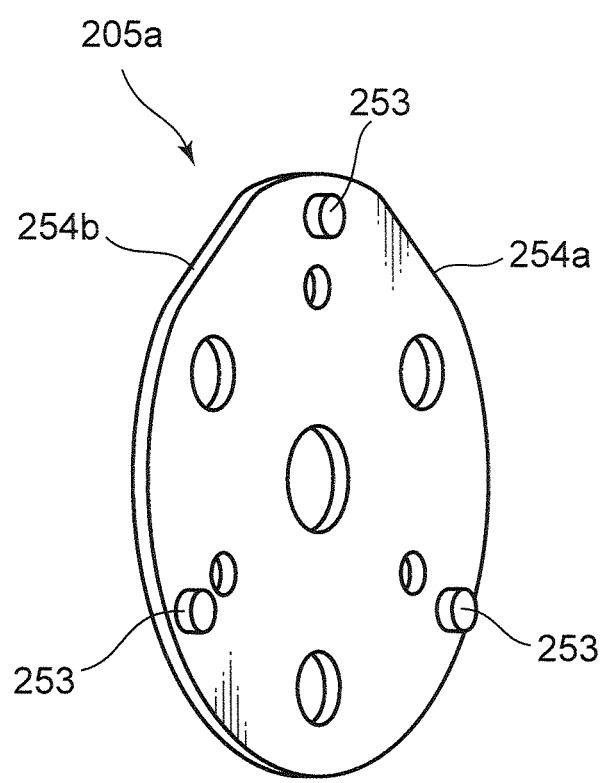
FIG. 23 is a perspective view illustrating the holding member by itself.
Figure 24:
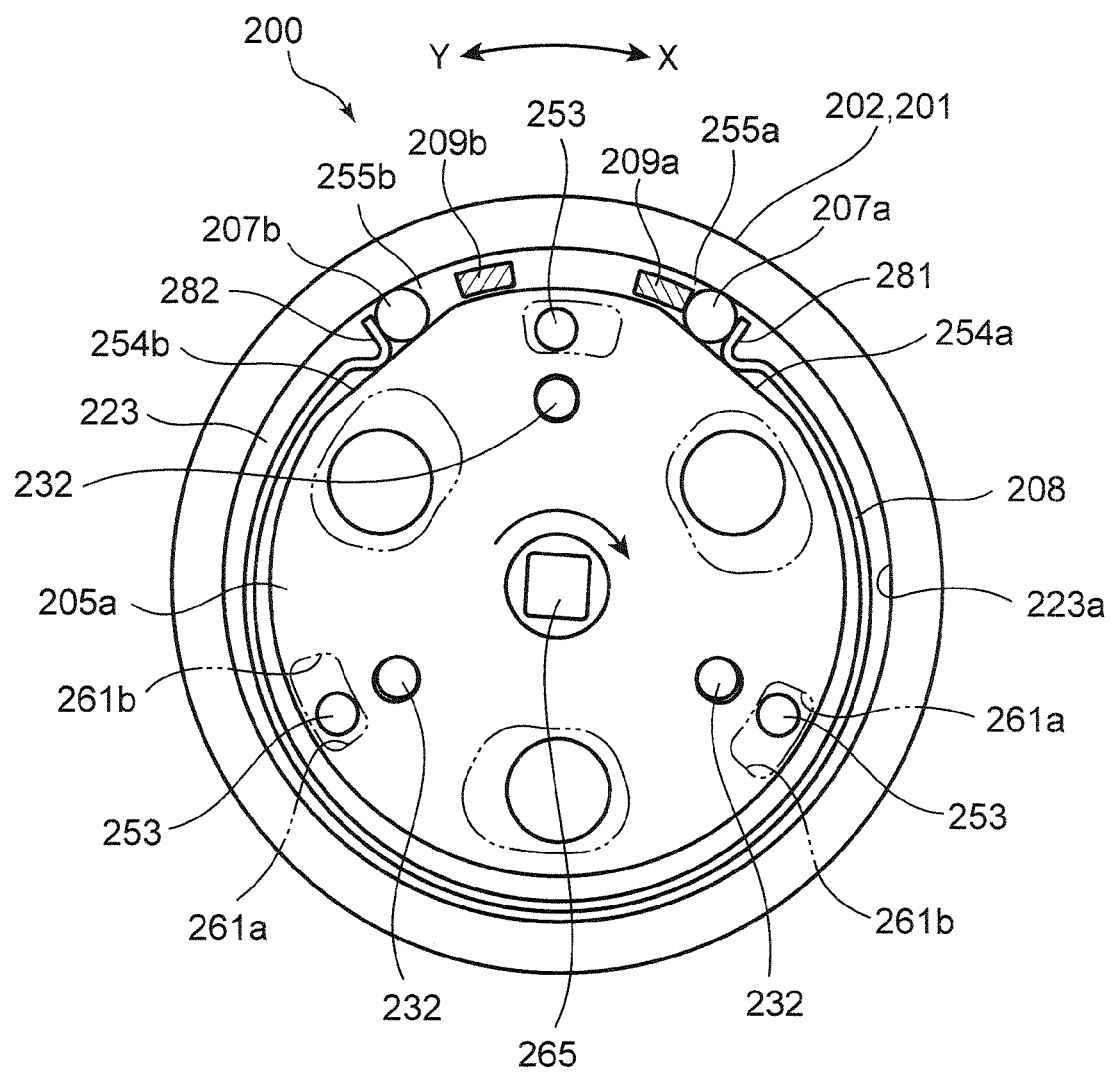
FIG. 24 is an explanatory view illustrating a state in which the rotational operating member is rotated from the state in FIG. 17 in a specific direction and thereby a first restriction releasing portion is brought into contact with a first restriction member.

In the second embodiment, the first holding member 205a has an outer peripheral surface provided with a first inclined wall portion 254a and a second inclined wall portion 254b, as illustrated in FIGS. 17 and 23.

The first inclined wall portion 254a is inclined in such a manner that a radial distance from a center of the first holding member 205a is gradually reduced toward the specific direction X, as with the inclined wall portion 54 in the first embodiment. The first inclined wall portion 254a of the first holding member 205a configured in the above shape, and an inner peripheral wall 223a of a concave portion 223 of the second plate 202, define therebetween the first wedge-shaped space 255a as illustrated in FIG. 17. Specifically, a width of the first wedge-shaped space 255a (a radial distance between the first inclined wall portion 254a and the inner peripheral wall 223a) is set to gradually become narrowed toward the counter direction Y.

The second inclined wall portion 254b is formed in a position symmetrical to the first inclined wall portion 254a with respect to a center line passing through the center of the first holding member 205*a*. The second inclined wall portion 254*b* is inclined in a direction opposite to that of the first inclined wall portion 254*a*, and a radial distance from the center of the first holding member 205*a* to the second inclined wall portion 254*b* is set to gradually become reduced toward the counter direction Y. The second inclined wall portion 254*b* of the first holding member 205*a* configured in the above shape, and the inner peripheral wall 223*a* of the concave portion 223 of the second plate 202, define therebetween the second wedge-shaped space 255*b* as illustrated in FIG. 17. Specifically, a width of the second wedge-shaped space 255*b* (a radial distance between the second inclined wall portion 254*b* and the inner peripheral wall 223*a*) is set to gradually become narrowed toward the specific direction X.

The first restriction member 207*a* is displaceably disposed in the first wedge-shaped space 255*a*, and the second restriction member 207*b* is displaceably disposed in the second wedge-shaped space 255*b*.

The biasing member 208 is composed of an open ring-shaped member which has one end provided with a first pushing piece 281 for pushing the first restriction member 207*a* in the counter direction Y, and the other end provided with a second pushing piece 282 for pushing the second restriction member 207*b* in the specific direction X.

As illustrated in FIGS. 15 to 17 and 22, the rotational operating member 206 has a first restriction releasing portion 209*a* for releasing a restriction by the first restriction member 207*a*, and a second restriction releasing portion 209*b* for releasing a restriction by the second restriction member 207*b*.

Each of the first restriction releasing portion 209*a* and the second restriction releasing portion 209*b* is integrally provided on the rotational operating member 206 to protrude from a peripheral edge thereof, at a position corresponding to a respective one of the first inclined wall portion 254*a* and the second inclined wall portion 254*b* of the first holding member 205*a*. The remaining configuration in the second embodiment is the same as that in the aforementioned first embodiment.

In the second embodiment configured as above, when a force in the rearward tilting direction R is applied to the seat back 102 (see FIG. 1), gear sections 231 of the planetary gears 203 are pressed against internal gears 212, 222 of the first plate 201 and the second plate 202 by actions of the first restriction member 207*a* within the first wedge-shaped space 255*a*, etc., so that a gap corresponding to backlash between the gear sections 231 and the internal gears 212, 222 is eliminated to prevent rolling displacement of the planetary gears 203, as with the aforementioned first embodiment. This makes it possible to, even if a force in the rearward tilting direction R is repeatedly applied to the seat back 102, reliably maintain the planetary gears 203 and the first holding member 205*a* in a fixed state and thereby reliably prevent the seat back 102 from being moved in the rearward tilting direction R.

On the other hand, when a force in the forwardly tilted direction F is applied to the seat back 102, the second restriction member 207*b* is relatively pushed in the specific direction X (in FIG. 17, a clockwise direction) within the second wedge-shaped space 255*b* defined between the second inclined wall portion 254*b* of the first holding member 205*a* and the inner peripheral wall 223*a* of the concave portion 223 of the second plate 202, so that the second restriction member 207*b* is brought into such a situation that it bites into a narrow region of the second wedge-shaped space 255*b*.

Thus, a force directed toward the center of the first holding member 205*a* is applied from the second restriction member 207*b* to the second inclined wall portion 254*b* of the first holding member 205*a*, and the first holding member 205*a* receiving this force acts to push a shaft 232 of at least one of the planetary gears 203 (in FIG. 17, shafts 232 of the lower two planetary gears 203), radially outwardly with respect to the first plate 201 and the second plate 202. According to this pushing, the gear section 231 of the planetary gear 203 is pressed against the internal gears 212, 222 of the first plate 201 and the second plate 202, so that a gap corresponding to backlash between the gear section 231 and the internal gears 212, 222 is eliminated. This makes it possible to, even if a force in the forward tilting direction F is repeatedly applied to the seat back 102, reliably maintain the planetary gears 203 and the first holding member 205*a* in a fixed state and thereby reliably prevent the seat back 102 from being moved in the forward tilting direction F.

On the other hand, when a seat occupant tilts the seat back 102 rearwardly to an arbitrary angle on his/her own will, he/she grips and rotationally operates a manual operation dial 266 (see FIG. 15) in the specific direction X (in FIG. 17, the clockwise direction).

When the manual operation dial 266 is rotationally operated in the specific direction X, the rotational operating member 206 is rotated in the same direction through a rotary shaft 265. According to this rotation, the first restriction releasing portion 209*a* of the rotational operating member 206 is brought into contact with the first restriction member 207*a*, as illustrated FIG. 24 (at this timing, each of first push-operation portions 261*a* of the rotational operating member 206 has not been brought into contact with a respective one of protruding pieces 253 of the first holding member 205*a*).

Subsequently, when the rotational operating member 206 is further rotated, the first restriction releasing portion 209*a* pushes the first restriction member 207*a* against a biasing force of the biasing member 208 to displace the first restriction member 207*a* in the specific direction X (i.e., a direction causing the width of the first wedge-shaped space 255*a* to become wider) within the first wedge-shaped space 255*a*. As a result, the rotational restriction by the first restriction member 207*a* is released.

Figure 25:
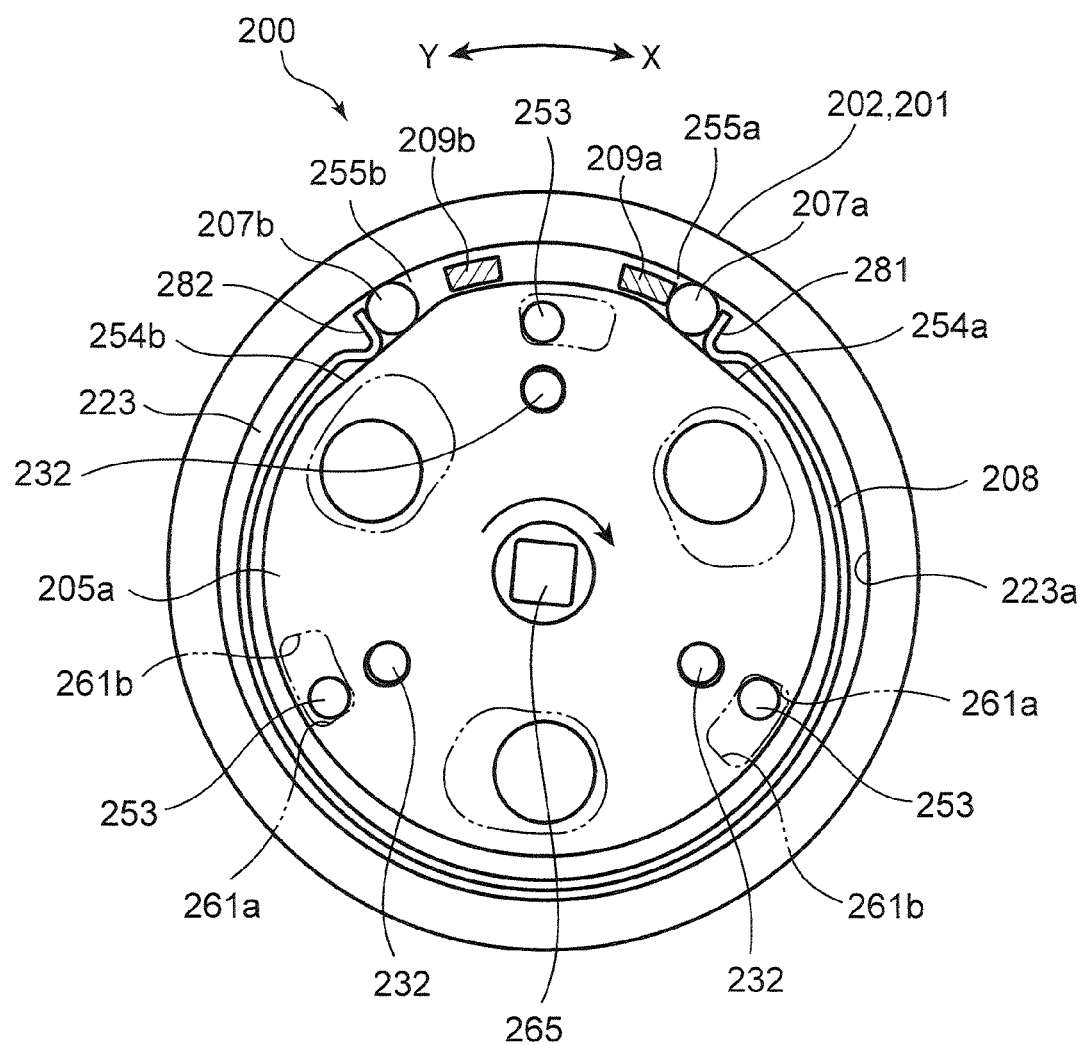
FIG. 25 is an explanatory view illustrating a state in which the rotational operating member is further rotated from the state in FIG. 24 in the specific direction.

When the rotational operating member 206 is further rotated from this state, each of the first push-operation portions 261*a* pushes a respective one of the protruding pieces 253 of the first holding member 205*a* in the specific direction X, to rotate the first holding member 205*a* in the same direction (i.e., rollingly displace the planetary gears 203 in the specific direction X), as illustrated in FIG. 25. Thus, the first plate 201 is relatively rotated with respect to the second plate 202 in the specific direction X, so that the seat back 102 is displaced in the rearward tilting direction R, as with the aforementioned first embodiment.

According to the rotation of the rotational operating member 206 in the specific direction X, the second restriction member 207*b* in the second wedge-shaped space 255*b* is relatively displaced in the counter direction Y (i.e., a direction causing the width of the second wedge-shaped space 255*b* to become wider), so that the rotation of the rotational operating member 206 is never hindered.

On the other hand, when a seat occupant tilts the seat back 102 forwardly to an arbitrary angle, he/she grips and rotationally operates the manual operation dial 266 (see FIG. 2) in the counter direction Y (in FIG. 17, a counterclockwise direction).

When the manual operation dial 266 is rotationally operated in the counter direction Y, the rotational operating member 206 is rotated in the same direction through the rotary shaft 265. According to this rotation, the second restriction releasing portion 209*b* of the rotational operating member 6 is brought into contact with the second restriction member 207*b* (at this timing, each of second push-operation portions 261*b* of the rotational operating member 206 has not been brought into contact with a respective one of the protruding pieces 253), although not illustrated. Subsequently, when the rotational operating member 206 is further rotated, the second restriction releasing portion 209b pushes the second restriction member 207b against a biasing force of the biasing member 208 to displace the second restriction member 207b in the counter direction Y (i.e., a direction causing the width of the second wedge-shaped space 255b to become wider) within the second wedge-shaped space 255b. As a result, the rotational restriction by the second restriction member 207b is released.

When the rotational operating member 206 is further rotated in the counter direction from this state, each of the protruding pieces 253 is pushed in the counter direction Y by a respective one of the second push-operation portions 261b, and accordingly the first holding member 205a is rotated in the same direction (i.e., the planetary gears 203 are rollingly displaced in the counter direction Y). Thus, the first plate 201 is relatively rotated with respect to the second plate 202 in the counter direction Y, so that the seat back 102 is displaced in the forward tilting direction F.

According to the rotation of the rotational operating member 206 in the counter direction Y, the first restriction member 207a in the first wedge-shaped space 255a is relatively displaced in the specific direction X (i.e., a direction causing the width of the first wedge-shaped space 255a to become wider), so that the rotation of the rotational operating member 206 is never restricted.

Although the first and second embodiments have been described as examples of a preferred embodiment of the present invention, the present invention is not limited to only the first and second embodiments but various changes and modifications may be made therein. For example, in the above embodiments, the reclining mechanism of the present invention has been applied to an automobile seat. However, the present invention may also be applied to a seat for various other apparatuses, such as trains and airplanes.

At the end of the description, distinctive features of the reclining mechanism disclosed in the above embodiments and functions/advantageous effects based on the features will be outlined below.

A reclining mechanism comprises: a ring-shaped first plate fixed to a seat back; a ring-shaped second plate capable of rotating with respect to the first plate and fixed to a seat cushion; a plurality of planetary gears in meshing engagement with internal gears provided in respective inner peripheries of the first plate and the second plate; a sun gear in meshing engagement with the planetary gears; a holding member rotatably holding the planetary gears; and a restriction member for restricting a rotation of the holding member. The holding member is rotatably disposed in a concave portion formed in a lateral surface of the second plate, and the holding member has an inclined wall portion provided in a part of an outer peripheral surface thereof in spaced-apart opposed relation to an inner peripheral wall of the concave portion. The inclined wall portion of the holding member and the inner peripheral wall of the concave portion define therebetween a wedge-shaped space in which the restriction member is displaceably disposed. The inclined wall portion of the holding member is formed such that a width of the wedge-shaped space is gradually narrowed toward a counter direction with respect to a specific direction, where the specific direction is a direction along which the first plate is urged to be rotated according to a force applied to the seat back in a rearward tilting direction, and the counter direction is a direction opposite to the specific direction.

In the above reclining mechanism, when a force in the rearward tilting direction is applied to the seat back, the restriction member is relatively pushed toward the counter direction (in a direction causing a width of the wedge-shaped space to become narrower), the restriction member bites into a narrow region of the wedge-shaped space. Thus, according to a force acting from the restriction member to the holding member, the planetary gears held by the holding member are pressed against the internal gears of the first plate and the second plate, so that a gap between corresponding ones of the planetary gears and the internal gears is eliminated. This makes it possible to prevent the planetary gears from being rollingly displaced along the internal gears of the first plate and the second plate. Thus, even if a force in the rearward tilting direction is repeatedly applied to the seat back, the planetary gears and the holding member can be reliably maintained in a fixed state, thereby reliably preventing the seat back from being moved in the rearward tilting direction.

Preferably, this reclining mechanism further comprises a biasing member biasing the restriction member disposed in the wedge-shaped space, in the counter direction.

According to this feature, it becomes possible to prevent the restriction member from being displaced in the specific direction in conjunction with the movement of the holding member. This allows the restriction member to be reliably pushed in the counter direction (a direction causing the width of the wedge-shaped space to become narrower) so as to maintain the seat back in a fixed state.

More preferably, this reclining mechanism further comprises a rotational operating member for rotationally operating the holding member. The rotational operating member has a restriction releasing portion for releasing the restriction by the restriction member. The restriction releasing portion pushes, according to a movement of the rotational operating member for rotationally operating the holding member in the specific direction, the restriction member against a biasing force of the biasing member to displace the restriction member in the specific direction within the wedge-shaped space.

According to this feature, when a seat occupant operates the rotational operating member to displace the seat back in the rearward tilting direction, the restriction releasing portion pushes and displaces the restriction member in the specific direction (the direction causing the width of wedge-shaped space to become wider), according to a rotation of the rotational operating member. Thus, it becomes possible to avoid a situation where the rotational operation of the holding member is hindered by the restriction member, so as to rotationally operate the holding member through the rotational operating member in a smooth manner.

More preferably, in this reclining mechanism, the rotational operating member has a push-operation portion for pushing the holding member to rotate it. The restriction releasing portion pushes and displaces, according a movement of the rotational operating member for rotationally operating the holding member in the specific direction, the restriction member in the specific direction, before the push-operation portion pushes the holding member.

According to this feature, during the rotationally operation of the holding member by the rotational operating member, the restriction releasing portion displaces the restriction member in the specific direction (the direction causing the width of wedge-shaped space to become wider), before the push-operation portion pushes the holding member. Thus, it becomes possible to more reliably avoid the situation where the rotational operation of the holding member is hindered by the restriction member.

Preferably, in the above reclining mechanism, the holding member has, in addition to the inclined wall portion referred to as a first inclined wall portion, a second inclined wall portion provided in the outer peripheral surface thereof. The first inclined wall portion and the inner peripheral wall of the concave portion define therebetween the wedge-shaped space referred to as a first wedge-shaped space whose width is gradually narrowed toward the counter direction, and the second inclined wall portion and the inner peripheral wall of the concave portion define therebetween a second wedge-shaped space whose width is gradually narrowed toward the specific direction. The restriction member referred to as a first restriction member is displaceably disposed in the first wedge-shaped space to restrict the holding member from being rotated in the specific direction. The reclining mechanism further comprises a second restriction member displaceably disposed in the second wedge-shaped space to restrict the holding member from being rotated in the counter direction.

According to this feature, even when one of two forces in a frontward tilting direction and in the rearward tilting direction is selectively applied to the seat back, it become possible to cause the restriction member (first restriction member or the second restriction member) to bite into a narrow region of one of the first wedge-shaped space and the second wedge-shaped space, so as to press the planetary gears against the internal gears of the first plate and the second plate to eliminate a gap between the planetary gears and the internal gears. This makes it possible to prevent the planetary gears from being rollingly displaced along the internal gears of the first plate and the second plate, and thereby reliably maintain the seat back in a fixed state.

More preferably, this reclining mechanism further comprises a biasing member for biasing the first restriction member disposed in the first wedge-shaped space, in the counter direction, and biasing the second restriction member disposed in the second wedge-shaped space, in the specific direction.

According to this feature, it becomes possible to prevent the first restriction member and the second restriction member from being displaced in conjunction with the movement of the holding member. Thus, even when one of the two forces in the frontward tilting direction and in the rearward tilting direction is selectively applied to the seat back, the seat back can be maintained in a fixed state by using the first restriction member or the second restriction member.

This application is based on Japanese Patent application No. 2011-258024 filed in Japan Patent Office on Nov. 25, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A reclining mechanism comprising:
   a ring-shaped first plate fixed to a seat back;
   a ring-shaped second plate capable of rotating with respect to the first plate and fixed to a seat cushion;
   a plurality of planetary gears in meshing engagement with internal gears provided in respective inner peripheries of the first plate and the second plate;
   a sun gear in meshing engagement with the planetary gears;
   a holding member rotatably holding the planetary gears; and
   a restriction member for restricting a rotation of the holding member,
   wherein:
   the holding member is rotatably disposed in a concave portion formed in a lateral surface of the second plate; and
   the holding member has an inclined wall portion provided in a part of an outer peripheral surface thereof in spaced-apart opposed relation to an inner peripheral wall of the concave portion,
   and wherein:
   the inclined wall portion of the holding member and the inner peripheral wall of the concave portion define therebetween a wedge-shaped space in which the restriction member is displaceably disposed; and
   the inclined wall portion of the holding member is formed such that a width of the wedge-shaped space is gradually narrowed toward a counter direction with respect to a specific direction, where the specific direction is a direction along which the first plate is urged to be rotated according to a force applied to the seat back in a rearward tilting direction, and the counter direction is a direction opposite to the specific direction.

2. The reclining mechanism as defined in claim 1, further comprising a biasing member biasing the restriction member disposed in the wedge-shaped space, in the counter direction.

3. The reclining mechanism as defined in claim 2, further comprising a rotational operating member for rotationally operating the holding member, wherein:
   the rotational operating member has a restriction releasing portion for releasing the restriction by the restriction member; and
   the restriction releasing portion pushes, according to a movement of the rotational operating member for rotationally operating the holding member in the specific direction, the restriction member against a biasing force of the biasing member to displace the restriction member in the specific direction within the wedge-shaped space.

4. The reclining mechanism as defined in claim 3, wherein:
   the rotational operating member has a push-operation portion for pushing the holding member to rotate it; and
   the restriction releasing portion pushes and displaces, according to a movement of the rotational operating member for rotationally operating the holding member in the specific direction, the restriction member in the specific direction, before the push-operation portion pushes the holding member.

5. The reclining mechanism as defined in claim 1, wherein:
   the holding member has, in addition to the inclined wall portion referred to as a first inclined wall portion, a second inclined wall portion provided in the outer peripheral surface thereof;
   the first inclined wall portion and the inner peripheral wall of the concave portion define therebetween the wedge-shaped space referred to as a first wedge-shaped space whose width is gradually narrowed toward the counter direction;
   the second inclined wall portion and the inner peripheral wall of the concave portion define therebetween a second wedge-shaped space whose width is gradually narrowed toward the specific direction;
   the restriction member referred to as a first restriction member is displaceably disposed in the first wedge-shaped space to restrict the holding member from being rotated in the specific direction; and a second restriction member is displaceably disposed in the second wedge-shaped space to restrict the holding member from being rotated in the counter direction.

6. The reclining mechanism as defined in claim 5, further comprising a biasing member for biasing the first restriction member disposed in the first wedge-shaped space, in the counter direction, and biasing the second restriction member disposed in the second wedge-shaped space, in the specific direction.

* * * * *